US010564990B1

(12) United States Patent
Kapulkin et al.

(10) Patent No.: US 10,564,990 B1
(45) Date of Patent: Feb. 18, 2020

(54) INTERACTIVE BUDGET DISPLAY INCLUDING DYNAMICALLY ADJUSTABLE BUDGET ELEMENTS

(75) Inventors: Yuri Kapulkin, Sunnyvale, CA (US); Marko S. Rukonic, San Jose, CA (US); Nicholas A. Mooney, San Jose, CA (US); Mitchell D. Bayersdorfer, Menlo Park, CA (US)

(73) Assignee: INTUIT INC., Mountain View, CA (US)

( * ) Notice: Subject to any disclaimer, the term of this patent is extended or adjusted under 35 U.S.C. 154(b) by 376 days.

(21) Appl. No.: 12/710,977

(22) Filed: Feb. 23, 2010

(51) Int. Cl.
*G06F 3/048* (2013.01)
*G06F 9/451* (2018.01)
*G06Q 10/10* (2012.01)
*G06F 3/01* (2006.01)

(52) U.S. Cl.
CPC .......... *G06F 9/453* (2018.02); *G06Q 10/103* (2013.01)

(58) Field of Classification Search
CPC ........ G06F 3/00; G06F 9/453; G06F 3/04895; G06Q 10/103; G06Q 10/06
USPC ................. 715/781, 762, 764, 784
See application file for complete search history.

(56) References Cited

U.S. PATENT DOCUMENTS

| | | | |
|---|---|---|---|
| 5,864,848 A * | 1/1999 | Horvitz | G06F 17/276 |
| 6,038,552 A | 3/2000 | Fleischl et al. | |
| 6,583,794 B1 | 6/2003 | Wattenberg | |
| 7,139,800 B2 * | 11/2006 | Bellotti | G06Q 10/107 709/206 |
| 7,216,121 B2 * | 5/2007 | Bachman | G06F 16/951 |
| 7,249,092 B2 | 7/2007 | Dunn et al. | |
| 7,818,399 B1 | 10/2010 | Ross et al. | |
| 8,438,091 B1 * | 5/2013 | Berman | G06Q 40/00 705/35 |
| 2002/0138582 A1 * | 9/2002 | Chandra | G06Q 10/10 709/206 |
| 2003/0126136 A1 * | 7/2003 | Omoigui | H04L 29/06 |
| 2003/0135558 A1 * | 7/2003 | Bellotti | G06Q 10/107 709/206 |

(Continued)

OTHER PUBLICATIONS

Newmap, http://newsmap.jp/, dated Feb. 23, 2010 (1page).

(Continued)

*Primary Examiner* — Nicholas Augustine
(74) *Attorney, Agent, or Firm* — DLA Piper LLP US

(57) ABSTRACT

Graphical user interfaces or visual representations of budgets and related systems and methods for visually presenting a budget and how consumer spending adheres to the budget. Budget elements or panels relate to budget categories, and respective sizes of budget elements indicate respective portions of income allocated to corresponding budget categories. Income amounts or desired savings amounts can be adjusted, in response to which sizes of the selected budget and savings elements are changed. After establishing a budget, the consumer purchases items. Corresponding budget elements are filled to indicate respective allocated amounts of income spent on respective budget elements by the consumer. An empty budget element indicates no money has been spent, a partially filled budget element indicates that some of the allocated income was spent, and a completely filled budget element indicates that all of the allocated income was spent. Overspending may be indicated by emphasizing the budget element.

37 Claims, 25 Drawing Sheets

(56) References Cited

U.S. PATENT DOCUMENTS

| | | | |
|---|---|---|---|
| 2004/0073615 A1* | 4/2004 | Darling | G06Q 10/109 709/206 |
| 2006/0059085 A1 | 3/2006 | Tucker | |
| 2006/0276180 A1 | 12/2006 | Coulter, Jr. et al. | |
| 2007/0106558 A1 | 5/2007 | Mitchell et al. | |
| 2007/0149252 A1* | 6/2007 | Jobs et al. | 455/566 |
| 2007/0244775 A1* | 10/2007 | Linder | 705/35 |
| 2008/0097811 A1* | 4/2008 | Kramer | G06Q 10/06 705/7.12 |
| 2008/0120129 A1* | 5/2008 | Seubert | G06Q 10/06 705/35 |
| 2008/0249984 A1* | 10/2008 | Coimbatore et al. | 707/3 |
| 2009/0037461 A1 | 2/2009 | Rukonic et al. | |
| 2010/0094770 A1* | 4/2010 | Sachedina | 705/348 |
| 2010/0104078 A1 | 4/2010 | Henry et al. | |
| 2010/0191550 A1 | 7/2010 | Hutson | |
| 2010/0250419 A1 | 9/2010 | Ariff et al. | |
| 2010/0268629 A1* | 10/2010 | Ross | G06Q 10/10 705/35 |
| 2010/0312684 A1 | 12/2010 | Kemper et al. | |
| 2011/0004546 A1 | 1/2011 | Thomas | |

OTHER PUBLICATIONS

SmartMoney, Map of the Market, Feb. 23, 2010 (1page).
Office Action dated Apr. 30, 2012, Interview Summary dated Jul. 23, 2012 and Amendment dated Jul. 25, 2012 in U.S. Appl. No. 12/571,289, filed Sep. 30, 2009.
Non-Final Office Action dated Dec. 1, 2011 in U.S. Appl. No. 12/545,525, filed Aug. 21, 2009, (12 pages).
Amendment dated Feb. 23, 2012 in U.S. Appl. No. 12/545,525, filed Aug. 21, 2009, (27 pages).
Interview Summary dated Feb. 27, 2012 in U.S. Appl. No. 12/545,525, filed Aug. 21, 2009, (3 pages).
Non-Final Office Action dated Oct. 13, 2011 in U.S. Appl. No. 12/771,990, filed Apr. 30, 2010, (11 pages).
Interview Summary dated Jan. 26, 2012 in U.S. Appl. No. 12/771,990, filed Apr. 30, 2010, (3 pages).
Amendment dated Feb. 6, 2012 in U.S. Appl. No. 12/771,990, filed Apr. 30, 2010, (10 pages).

* cited by examiner

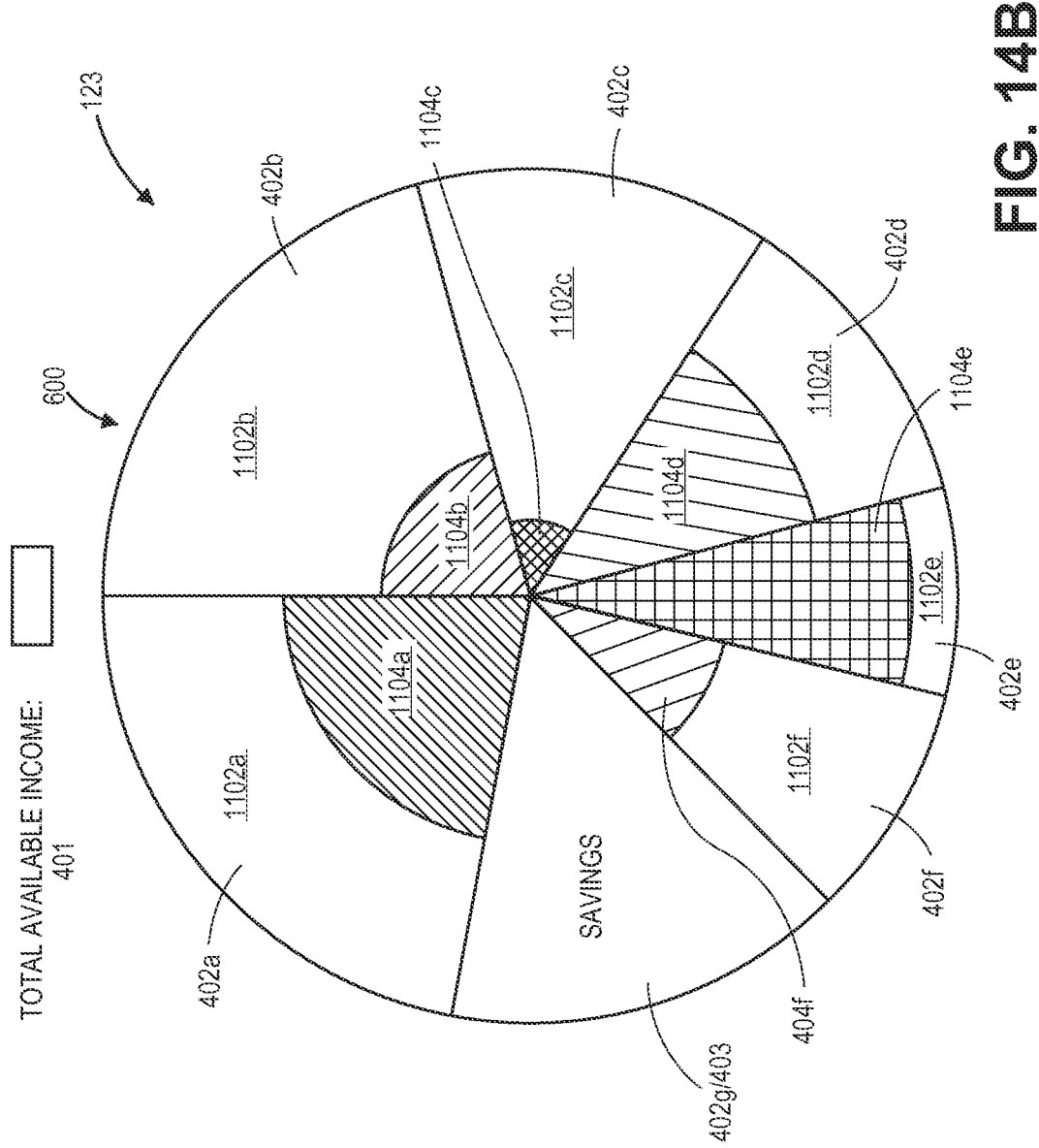

INTERACTIVE BUDGET DISPLAY INCLUDING DYNAMICALLY ADJUSTABLE BUDGET ELEMENTS

BACKGROUND

The invention is generally related to personal finance and money management, and more particularly, to personal finance programs that are operable to create a budget and show how consumer spending adheres to the budget. Money management and sticking to a budget are very important to consumers, but effective money management and budget analysis are often difficult to implement. These difficulties may be due to various reasons including, for example, financial information being stored in different files or at different financial institutions, consumers losing or not keeping receipts, consumers forgetting about purchases, and difficulty in collecting and compiling pertinent financial information into an understandable format. As such, consumers often analyze budgets with a piecemeal approach involving manual entry of data, referring to different graphs, spending summaries or statements, tracking the receipts that were kept and not discarded or lost, and performing calculations involving these items.

In view of these inconveniences and difficulties, various personal finance programs have been utilized to provide assistance to consumers with managing their finances and budgets. Examples of known personal finance programs include FinanceWorks®, Quicken®, Mint, Wesabe, Thrive, Geezeo, and MoneyStrands. FinanceWorks® and Quicken® are registered trademark of Intuit Inc., Mountain View, Calif., and Mint is also available from Intuit Inc.

While personal finance program have greatly improved money management, there are still various shortcomings in the manner in which budget data is presented to consumers and in view of consumers still being restrained by data availability and organization. These issues make it difficult for consumers to effectively track how spending relates to a budget, particularly considering that consumers typically spend money on a multitude of different types of goods and services at various times utilizing various forms of payment.

SUMMARY

One embodiment is directed to a computer or graphical user interface for providing a visual representation of a budget to a consumer. The visual representation comprises a plurality of budget elements that are displayed within a single screen or view. The plurality of budget elements collectively define the budget and are configured or arranged such that the budget elements represent respective amounts of income allocated to respective budget elements. At least one budget element is a savings element that indicates a target savings amount. Changing or adjusting an amount of income allocated to a selected budget element results in a change or adjustment to the target savings amount, e.g., by changing the actual amount of income allocated to the selected budget element or by indicating how much is to be saved on the selected budget element.

A further embodiment is directed to a computer interface for providing a visual representation of a budget, the visual representation comprising a plurality of budget elements displayed within a single screen or view that collectively define the budget. The budget comprises respective amounts of income allocated to respective budget elements, and the plurality of budget elements are fillable. Thus, embodiments are dynamic in that budget elements are filled to indicate respective portions of allocated income that have been spent on respective budget elements by the consumer.

Another embodiment is directed to a computer interface for providing a visual representation of a budget that comprises a plurality of budget elements displayed within a single screen or view that collectively define the budget that comprises respective amounts of income allocated to respective budget elements, at least one of which is a savings element that indicates a target savings amount. Adjusting or changing an amount of income allocated to a budget element results in an adjustment or change to the target savings amount. After the budget has been established, the plurality of budget elements are fillable to indicate respective portions of allocated income that have been spent by a consumer on respective budget elements.

Yet another embodiment is directed to a computer interface for providing a visual representation of a budget and that comprises a plurality of budget elements displayed within a single screen or view and collectively defining the budget. Respective sizes of budget elements (e.g., areas of two-dimensional budget elements or volumes of three-dimensional budget elements) represent respective amounts of income allocated to respective budget elements. After the budget has been established, the plurality of budget elements are fillable to indicate respective allocated amounts of income that have been spent by a consumer on respective budget elements.

An additional embodiment is directed to a method of providing budget information to a computer utilized by a consumer, the method comprises determining an amount of available income with the computer (e.g., as input by the consumer or received from a personal finance program such as Quicken®, Mint, Wesabe and other programs that are utilized to manage accounts and finances. The method further comprises generating and displaying a visual representation of a budget based at least in part upon the amount of available income with the computer and displaying the visual representation on the computer to the consumer. The visual representation comprises a plurality of budget elements displayed within a single screen or view and collectively define the budget, which indicates respective amounts of available income allocated to respective budget elements. The respective sizes of the plurality of budget elements represent respective amounts of available income allocated to respective budget elements, at least one of which is a savings element that indicates a target savings amount. The method further comprises receiving input at the computer from the consumer that selects a budget element and indicates a desired amount of savings on the selected budget element, and adjusting the target savings amount displayed on the computer to the consumer based at least in part upon the desired amount of savings on the selected budget element.

Another embodiment is directed to a method of providing budget information to a consumer and comprises determining an amount of available income with the computer, generating and displaying a visual representation of a budget based at least in part upon the amount of available income with the computer and displaying the visual representation on the computer. The visual representation comprises a plurality of budget elements that are displayed within a single screen or view and that collectively define the budget including respective amounts of available income allocated to respective budget elements. The method further comprises receiving input of an amount spent by the consumer on a particular budget element, and filling at least a portion of the particular budget element to indicate what portion of income allocated to the particular budget element has been spent by the consumer. Thus, embodiments are dynamic in that budget elements are adjusted or filled as the consumer spends income on various goods and services.

Yet another embodiment is directed to a method for providing budget information to a computer utilized by a consumer and comprises determining an amount of available income with the computer, generating and displaying a visual representation of a budget based at least in part upon the amount of available income with the computer. The method further comprises displaying the visual representation on the computer. The visual representation comprises a plurality of budget elements displayed within a single screen or view and collectively defining the budget, which comprises respective amounts of available income allocated to respective budget elements, at least one of which is a savings element that indicates a target savings amount. The method further comprises receiving a first input from the consumer at the computer, the first input comprising selection of a budget element and indicating a desired amount of savings on the selected budget element, and adjusting the target savings amount based at least in part upon the desired amount of savings on the selected budget element. The method further comprises receiving a second input at the computer, the second input comprising an amount spent by the consumer on a particular budget element, and filling at least a portion of the particular budget element to indicate what portion of income allocated to the particular budget element has been spent by the consumer.

A further embodiment is directed to a method of providing budget information to computer utilized by a consumer and comprises determining an amount of available income with the computer; generating and displaying a visual representation of a budget based at least in part upon the amount of available income with the computer. The visual representation comprises a plurality of budget elements displayed within a single screen or view and collectively defining the budget, which includes respective amounts of available income allocated to respective budget elements. Respective sizes of the plurality of budget elements represent respective amounts of available income allocated to respective budget elements. The method further comprises receiving input comprising an amount spent by the consumer on a particular budget element and filling at least a portion of the particular budget element to indicate what portion of allocated income for the particular budget element has been spent by the consumer.

In certain embodiments, method embodiments may performed by executable code, software or instructions, which may be stored on an article of manufacture comprising a computer program carrier that is readable by a computer such that instructions are executable by the computer to perform method steps of programming a computer for allocating a tax refund to different accounts. Embodiments may be a separate program or a program or module of a personal finance program.

A further embodiment is directed to a system for providing budget information to a consumer. The system comprises a computer and a budget program that can execute thereon or that is accessible by the computer. The budget program is executable to perform method steps of determining an amount of available income with the computer (e.g., as input by the consumer or retrieve from a personal finance program such as Quicken®, Mint, Wesabe and other personal finance programs), generating a visual representation of a budget based at least in part upon the amount of available income with the computer and displaying the visual representation on the computer. The visual representation comprises a plurality of budget elements displayed within a single screen or view and that collectively define the budget, which includes respective amounts of available income that are allocated to respective budget elements. Respective sizes of the plurality of budget elements represent respective amounts of available income allocated to respective budget elements, at least one of which is a savings element indicating a target savings amount. The budget program is further executable to perform method steps of receiving, at the computer and from the consumer, input that selects a budget element and indicates a desired amount of savings on the selected budget element, and adjusting the target savings amount displayed to the consumer based at least in part upon the desired amount of savings on the selected budget element.

Another embodiment is directed to a system for providing budget information to a consumer and comprises a computer and a budget program that can execute thereon and that is executable to perform method steps of determining an amount of available income with the computer, generating a visual representation of a budget based at least in part upon the amount of available income with the computer, and displaying the visual representation on the computer. The visual representation comprises a plurality of budget elements displayed within a single screen or view and collectively defining the budget, which includes respective amounts of available income allocated to respective budget elements. The budget program is also executable to receive input of an amount spent by the consumer on a particular budget element and fill at least a portion of the particular budget element to indicate what portion of income allocated to the particular budget element has been spent by the consumer.

Yet another embodiment is directed to a system for providing budget information to a consumer. The system comprises a computer and a budget program that can execute thereon. The budget program is executable to perform method steps of determining an amount of available income with the computer, generating a visual representation of a budget based at least in part upon the amount of available income with the computer, and displaying the visual representation on the computer. The visual representation comprises a plurality of budget elements displayed within a single screen or view and collectively defines the budget, which includes respective amounts of available income allocated to respective budget elements, at least one of which is a savings element that indicates a target savings amount. The budget program is also executable to perform method steps of receiving, from the consumer and at the computer, a first input that selects a budget element and indicates a desired amount of savings on the selected budget element, adjusting the target savings amount based at least in part upon the desired amount of savings on the selected budget element, receiving, at the computer, a second input of an amount spent by the consumer on a particular budget element, and filling at least a portion of the particular budget element to indicate what portion of income allocated to the particular budget element has been spent by the consumer.

Yet another embodiment is directed to a system for providing budget information to a consumer and comprises a computer and a budget program executable on the computer. The budget program is executable to perform method steps comprising determining an amount of available income with the computer, generating a visual representation of a budget based at least in part upon the amount of available income with the computer, and displaying the visual representation on the computer. The visual representation comprises a plurality of budget elements that are displayed within a single screen or view and that collectively define the budget, which includes respective amounts of available income allocated to respective budget elements. Respective sizes of the plurality of budget elements represent respective amounts of available income allocated to respective budget elements. The budget program is also executable to perform method steps of receiving input of an amount spent by the consumer on a particular budget element and filling at least a portion of the particular budget element to indicate what portion of allocated income for the particular budget element has been spent by the consumer.

In one or more embodiments, a window or other input element is generated in response to a consumer selecting a budget element and allows the consumer to enter a desired amount of savings on the selected budget element. For example, a budget element for "entertainment" may be selected and the window may ask the consumer "How much do you want to save on entertainment?" The amount of savings on the selected budget element results in a change or adjustment to the amount of income allocated to the selected budget element such that respective sizes of the selected budget element and the savings element change to reflect the change or adjustment in savings and spending on the selected budget element. For example, if the consumer input indicates that more money should be saved rather than being spent on entertainment, the "entertainment" budget element will become smaller, whereas the savings element (representing total savings) will be enlarged. An "entertainment" savings sub-element may also be generated and included within the larger savings element to graphically illustrate how much of the overall savings is due to the savings on entertainment. In contrast, if the consumer decides that more money can be allocated for spending on entertainment, a budget element representing entertainment is enlarged whereas a size of savings element is reduced. The re-sized budget and savings elements are then merged or integrated into the view and may be re-shaped and/or re-positioned as necessary, and the shape and/or position of one or more other budget elements may be adjusted as necessary in order to obtain an acceptable or best fit of all of the budget elements. Thus, it may be the case that budget elements are re-sized or they may be re-sized, re-shaped and/or re-positioned within the view depending on how they are integrated with the other budget elements.

In one or more embodiments, the area or sizes of the plurality of budget elements represents available income allocated to respective budget elements, and the sum of the budget element amounts represents the available income. Types of spending represented by budget elements may involve discretionary spending (e.g., entertainment, coffee, meals other than necessary meals) and non-discretionary spending (e.g., living expenses such as rent or mortgage, necessary groceries, utilities, transportation expenses such as insurance, car payments and gas). A consumer may select which categories or merchants involve discretionary spending that may involve more savings opportunities and non-discretionary spending that may be more rigid and offer fewer savings opportunities. In certain embodiments, discretionary budget elements are more flexible or easier to adjust compared to non-discretionary budget elements in order to have the consumer allocate sufficient money to cover necessities or to discourage consumers from spending money that would normally be allocated to necessities on discretionary or unnecessary items. For example, amounts of income allocated to discretionary spending may be changed by more than amounts of income allocated to non-discretionary spending. Thus, embodiments may involve non-discretionary budget element that are fixed or that only provide for limited adjustment.

In one or more embodiments, after the consumer has established the budget, the consumer spends money on various goods and services, and data related to spending (e.g., amounts spent on categories that corresponding to budget element labels or categories) is provided to a budget program, which then determines how actual spending on various categories corresponds to the budget amounts reflected in respective budget elements. For example, as the consumer spends money on "entertainment," the budget element for "entertainment" can be filled by an amount corresponding to the actual amount spend relative to the budgeted amount to provide a graphical representation of money spent on entertainment and how much more can be spent before going over budget. For example, if the budget amount recited in a budget element is $100, and the consumer has spent $25, then 25% of the budget element is filled (e.g., with a certain color or pattern from bottom to top (similar to a fishbowl) or from left to right) to indicate that the consumer has spent some (25%), but not all, of the amount budgeted for entertainment. As the consumer spends more on entertainment, the entertainment budget element is filled and may be completely filled to indicate that all of the income allocated to entertainment has been spent. Spending less than the allocated amount results in additional savings. Additional income spent on entertainment will result in spending that exceeds the budget amount for entertainment, in which case the budget element for that particular spending category can be emphasized utilizing a border, color, pattern, size, etc. (e.g., the budget element may be enlarged). These is may be done for all of the budget elements such that there may be certain budget elements that are not filled or are empty to indicate that none of the allocated income has been spent, whereas other budget elements are partially filled to indicate that some of the allocated income has been spent, and yet other budget elements may be completely filled and/or emphasized to indicate that all of the income allocated to those budget elements has been spent or the consumer has gone over budget on those budget elements. In one or more embodiments, a budget program is executed to send a message (e.g., e-mail, text message, etc.) to the consumer to inform the consumer that the consumer has reached a pre-determined spending level or is approaching or has exceeded a budget amount.

BRIEF DESCRIPTION OF THE DRAWINGS

The foregoing and other aspects of embodiments are described in further detail with reference to the accompanying drawings, wherein:

FIG. 14B illustrates one embodiment of a visual representation of a budget having a circular collection of budget elements, some of which are partially or completely filled as a result of consumer spending;

DETAILED DESCRIPTION OF ILLUSTRATED EMBODIMENTS

Embodiments are directed to providing a snapshot of a budget within a single view or screen on a computer to allow a consumer to quickly determine how spending relates to a budget. The budget may be an existing budget, based on prior transaction data and/or consumer input, or a consumer may create a new budget. With embodiments, a budget program generates a computer interface that provides a visual representation of the budget in the form of budget elements, segments, objects or panels (generally, "budget elements"). Budget elements may be identified by category, merchant name, or another identifier. The collection of budget elements represent the amount of income to be budgeted, and the sizes of the budget elements correspond to or indicate respective amounts of income allocated to respective budget elements. Budget elements can be customized by the consumer so that amounts of income allocated to budget elements can be changed which, in turn, changes a target savings amount such that respective sizes of a changed budget element and a savings element are adjusted accordingly.

After the budget is established, transaction data generated by consumer purchases is collected, categorized, mapped or related to budget categories and corresponding budget elements. Consumer spending relative to the budget is indicated by filling budget elements as the consumer spends money on the budget elements to graphically indicate consumer spending on particular budget elements. This provides the consumer with a composite, dynamic and updated view of the budget, a simultaneous view of spending and the budget, and spending with respect to particular budget elements, all within a single visual representation. Updates to filling of budget elements may be done periodically or in real-time. In this manner, a consumer can quickly and accurately determine details regarding their budgets, how money not spent on certain items can result in savings, spending, spending patterns and whether the consumer is under or over budget with regard to specific budget categories and with regard to the budget as a whole. In addition to providing a composite budget view within a single view or screen, embodiments also provide for notifications or alerts when spending on a particular budget element reaches a certain level or exceeds a budgeted amount. Further aspects of various embodiments are described with reference to FIGS. 1-19.

Figure 1:
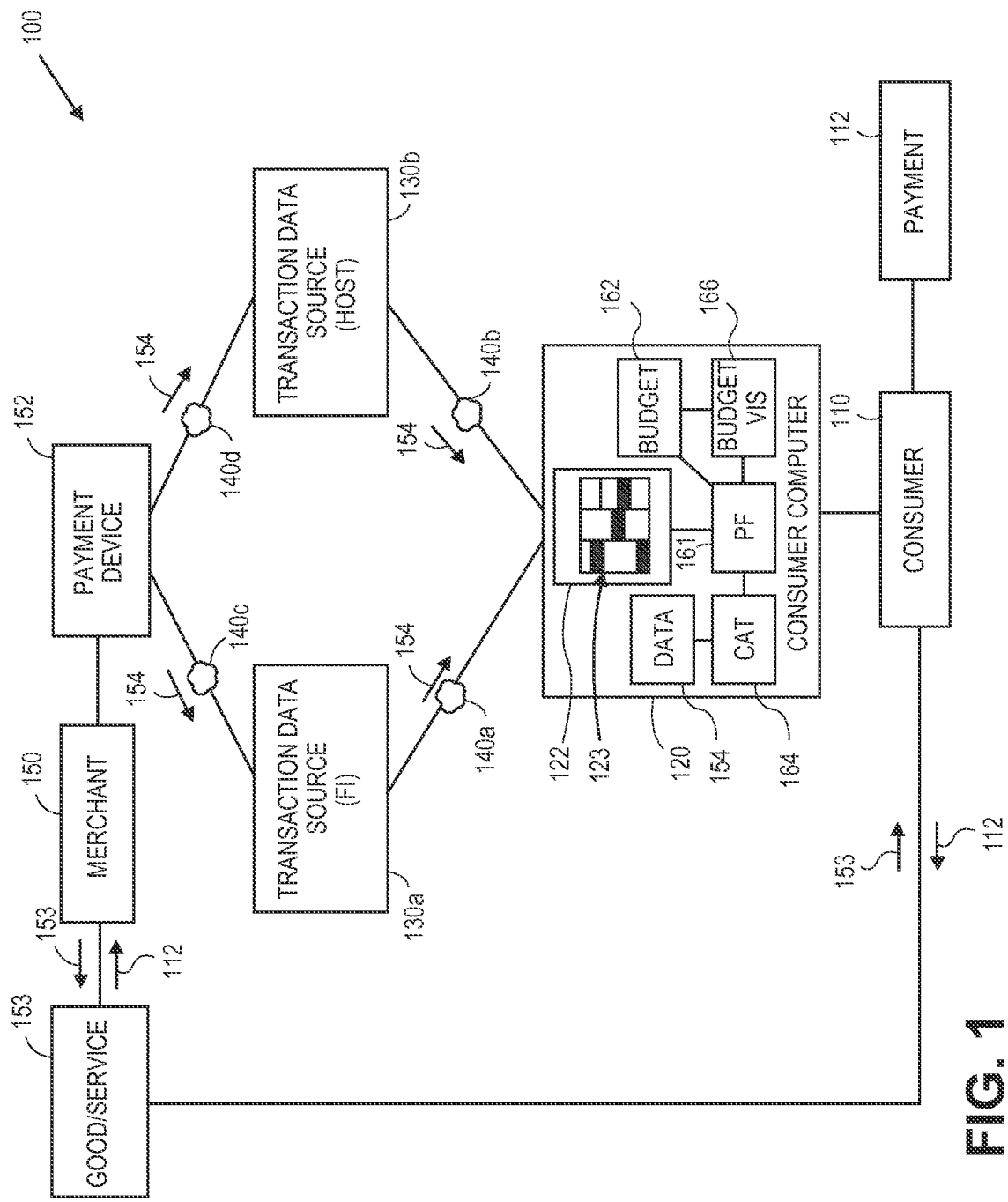
FIG. 1 illustrates a system constructed according to one embodiment for generating a visual representation of a budget.
Figure 2:
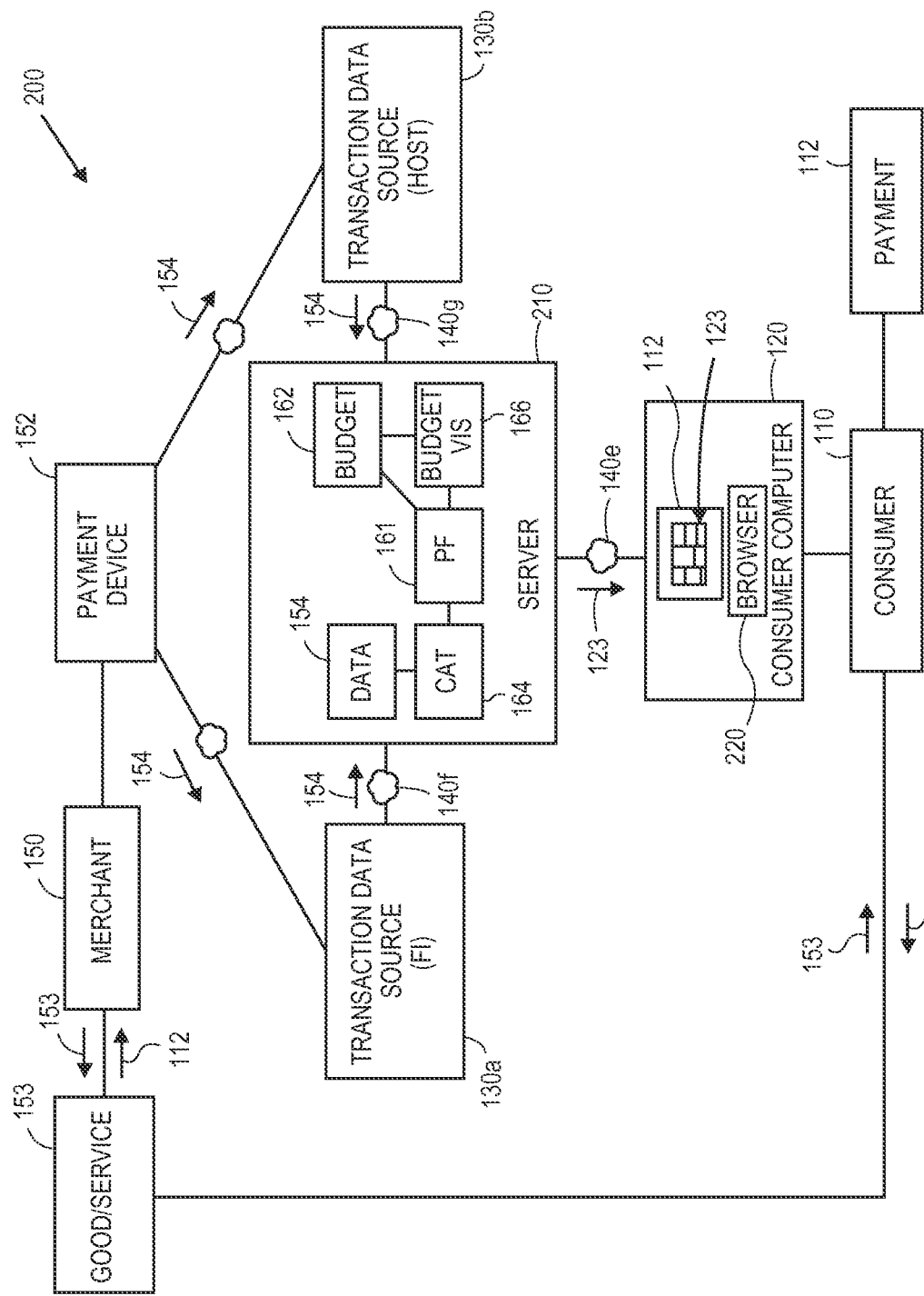
FIG. 2 illustrates a system constructed according to one embodiment for generating a visual representation of a budget in which at least one of a personal finance program, categorization program and a budget visualization program is an on-line program residing on a server.
Figure 3:
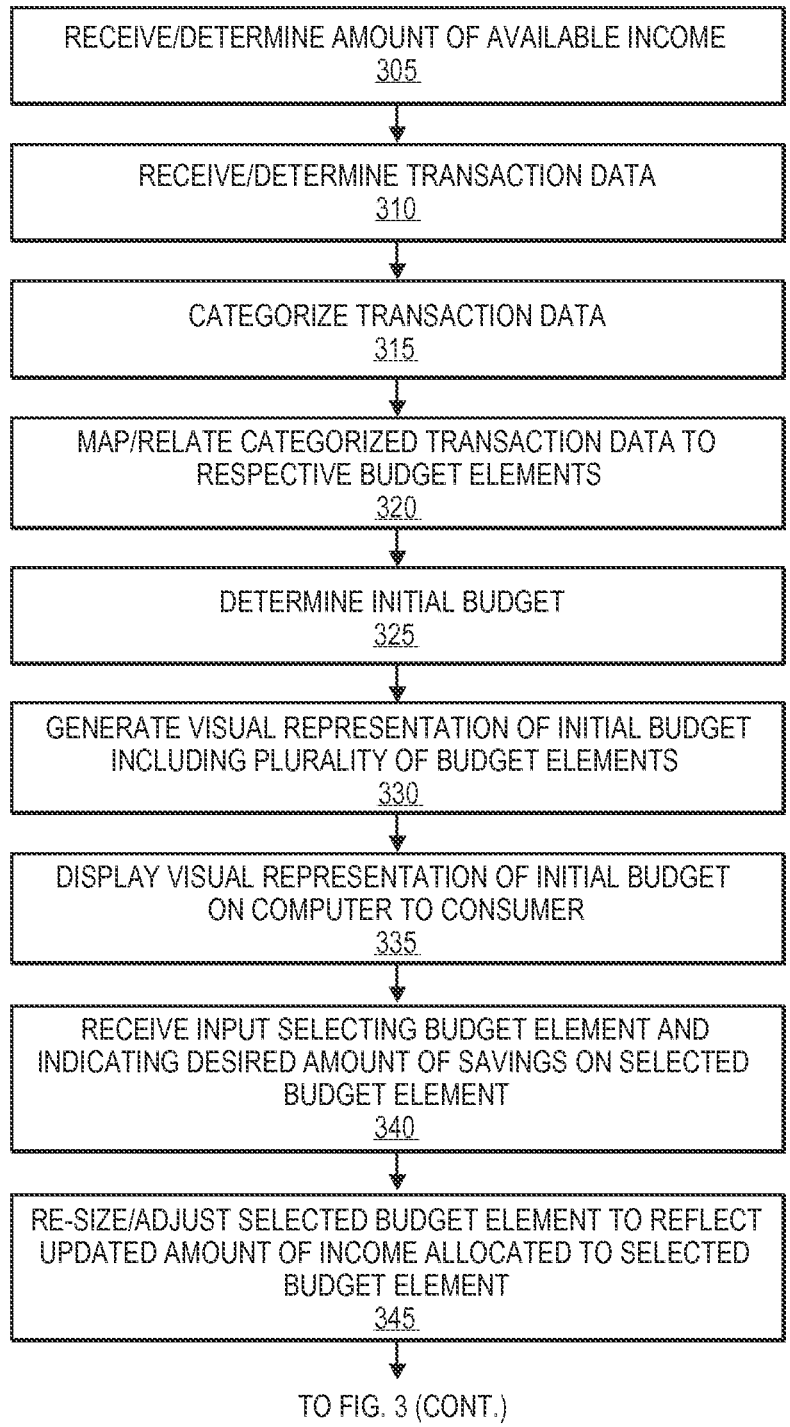
FIG. 3 is a flow diagram of one embodiment of a method for providing budget information to a computer utilized by a consumer by generating and displaying a visual representation of a budget.
Figure 3:
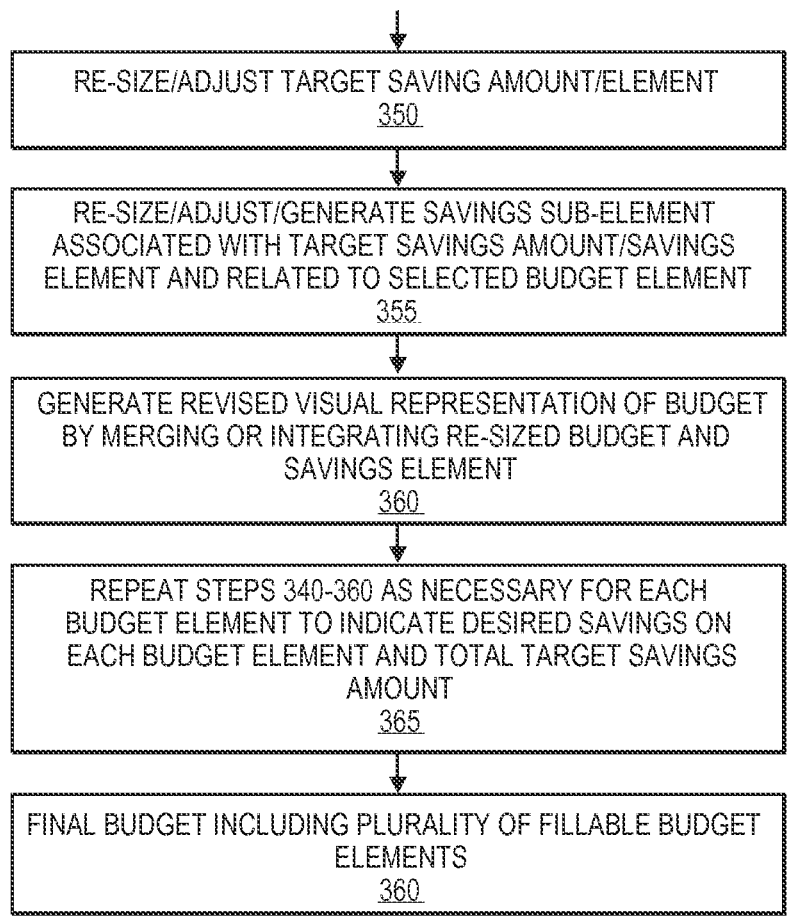

Referring to FIGS. 1-3, embodiments are directed to systems 100, 200 and related methods 300 and associated budget programs and articles of manufacture for visualizing budgets and how consumer spending adheres to a budget. Referring to FIG. 1, a system 100 constructed according to one embodiment includes or involves a consumer 110 utilizing a computer 120 that is operably coupled to or in communication with one or more sources or data stores 130a,b of transaction data 154 (generally, transaction data source 130) through respective networks 140a,b which, in turn, are operably coupled to or in communication with a computer or payment device 152 of a merchant 150 through respective networks 140c, 140d. One or more of the networks 140a-d (generally, network 140) and other networks 140 discussed herein may be a Local Area Network (LAN), a Wide Area Network (WAN), Metropolitan Area Network (MAN), a wireless network, other suitable networks capable of transmitting data, and a combination of such networks. For ease of explanation, reference is made to a network 140 generally, but various networks, combinations of networks and communication systems, methods and protocols may be utilized in embodiments.

The consumer 110 purchases various goods and services 153 (generally, good 153) from the merchant 150 utilizing a form of payment 112 such as a payment card (e.g., credit or debit card), cash, check or other form of payment (generally, payment 112). The consumer 110 may be an individual or corporate or government entity, and the merchant 150 may be an in-store or brick and mortar merchant or on-line merchant that sells goods 153 through respective websites. Further, the consumer 110 may purchase various types and numbers of goods 153 from various merchants 150. Examples of consumer goods 153 that may be purchased by an individual consumer 110 include, for example, home or house wares, groceries, electronics, home repair, healthcare or personal hygiene items, clothing, business items, books, etc. For ease of explanation, reference is made to an individual consumer 110 who purchases a good 153 from a merchant 150, but it should be understood that embodiments may apply to various types and numbers of consumers 110 and merchants 150 and goods 153.

Depending on the form of payment 112 tendered by the consumer 110 for the purchase of a good 153, the merchant 150 processes the transaction with payment or transaction processing device 152 such as a Point of Sale (POS) payment terminal, cash register, computer, scanner system, etc. (generally, payment device 152). In response to a purchase of a good 153 from the merchant 150, electronic transaction data 154 is transmitted from the payment device 152 to one or more transaction data sources 130 such as one or more of a financial institution 130a (such as a bank or credit card company) or host 130b of transaction data 154 such as Intuit Inc. or other host. Although FIG. 1 illustrates one merchant 150, one consumer 110 and two transaction data sources 130, it should be understood that embodiments may involve multiple merchants 150, multiple consumers 110 and/or different numbers of transaction data sources 130. Thus, it will be understood that the system 100 configuration shown in FIG. 1 is provided for ease of explanation in a non-limiting manner.

In the embodiment illustrated in FIG. 1, a personal finance program 161 ("PF" in FIG. 1) such a FinanceWorks®, Quicken®, Mint, Wesabe, Thrive, Geezeo, MoneyStrands or another personal finance program 161 executes on the consumer computer 120. The consumer computer 120 also includes a screen 122 on which is displayed a graphical user interface that provides a visual representation 123 of a budget 162 and that includes a plurality of budget elements. The budget 162 may be generated with the personal finance program 161. The personal finance program 161 may include or utilize a categorization program 164 ("Cat" in FIG. 1) that categorizes transaction data 154 (e.g., according to merchant name, identification code, types of goods, or other categorization criteria) received from one or more transaction data sources 130. Categorized transaction data 154 is integrated into the budget 162. Transaction data 154 may also be manually entered by the consumer 110 and categorized by the categorization program 164 or manually categorized by the consumer 110. According to embodiments, a budget visualization program 166 ("Budget Vis" in FIG. 1) transforms data of the budget 162 into an interface or visual representation 123 that includes a plurality of budget elements that are displayed as a single view or screen 122 to the consumer 110.

In the embodiment shown in FIG. 1, the personal finance program 161, the categorization program 164 and the budget visualization program 166 are desktop or local programs that execute locally on the consumer computer 120. In another embodiment, referring to FIG. 2, one or some or all of these programs may execute on a remote server 210 that is operably coupled to or in communication with the consumer computer 110 and one or more transaction data sources 130 through respective networks 140e-g. The consumer 110 executes a browser 220 on the computer 120 to access a website on the server 210 to utilize one or more of these programs such as the personal finance program 161, which may include or be associated with one or both of the budget visualization program 166 and the categorization program 164. The interface that provides a visual representation 123 of the budget 162 according to embodiments is displayed on the screen 122 of the consumer computer 120. For ease of explanation, reference is made generally to the system 100 configuration shown in FIG. 1 in which various program reside and execute on the consumer computer 120, but it should be understood that embodiments may involve local and remote versions of one or more or all of the programs discussed herein.

Further aspects of system embodiments, methods for providing a visual representation 123 of the budget 162 utilizing the system 100 shown in FIG. 1, and aspects of the visual representation 123 including a plurality of budget elements are described in further detail with reference to FIGS. 3-18.

Referring to FIG. 3, one embodiment of a method 300 for providing budget information to a computer 120 utilized by a consumer 110 comprises determining an initial budget 162. The initial budget 162 may be an existing budget that was generated utilizing the personal finance program 161 or a new budget 162 that is created by the consumer 110 or based on data collected or retrieved by the personal finance program 161. For example, at stage 305, the amount of available income that is to be budgeted is received or determined by the personal finance program 161. The amount of available income may be determined based on one or more of data already entered using the personal finance program 161 (e.g., the consumer 110 may have specified an income amount in an existing budget 162 or the personal finance program 161 may have access to an on-line bank account or other source to determine a weekly, bi-weekly or monthly electronic deposit from an employer). The specified amount may be based on a salary of the consumer 110 and/or other sources of income including monthly interest earnings in checking and savings accounts.

The consumer 110 may also specify the amount of income available, which may be less than the total income of the consumer 110.

At stage 310, the personal finance program 161 receives transaction data 154, which may be received from a transaction data source 130 such as a financial institution 130a, a transaction data host 130b or other source. Transaction data 154 may also be received from the consumer 110 in cases in which transaction data 154 is manually entered by the consumer 110 who utilizes the personal finance program 161 to enter data of cash or other transactions that are not included in the electronic transaction data 154.

At stage 315, transaction data 154 is categorized utilizing the categorization program or module 164. According to one embodiment, categorization is performed automatically according to merchant 150 name or identifier, a name or identifier of good or service, or other criteria. For example, if transaction data 154 relates to a purchase from Starbucks®, the personal finance program 161 may categorize the purchase as "Food & Dining" and may further categorize the purchase as "Coffee Shops" depending on whether lower level categories are utilized, and for transaction data 154 related to a purchase from Netflix®, the personal finance program 161 may categorize the purchase as "Entertainment" and may further categorize the purchase as "Movies & DVDs." Thus, categorization may involve higher level categorization (e.g., business expenses, entertainment, home, kids, personal care, pets, shopping, travel, etc.) and/or lower or item level categorization (e.g., tools, coffee, groceries, cigarettes, etc.). One manner of performing categorization is described in U.S. Publication No. US 2009/0037461 A1 to Rukonic et al., the contents of which are incorporated herein by reference as though set forth in full. It should, however, be understood that other categorization methods may be utilized.

At stage 320, categorized transaction data is mapped or related to corresponding budget elements of the visual representation 123 of the budget 162 to be displayed to the consumer 110 according to embodiments. In certain embodiments, the budget elements are identified using the same categories or sub-categories. For example, a "coffee" category or sub-category may be mapped to a "coffee" budget element. In other embodiments, in the event there is not a match, the categories or sub-categories are mapped to corresponding budget elements. For example, a "DVD" category or sub-category may be mapped to an "entertainment" budget element through the use of a table or other mapping element.

Figure 4:
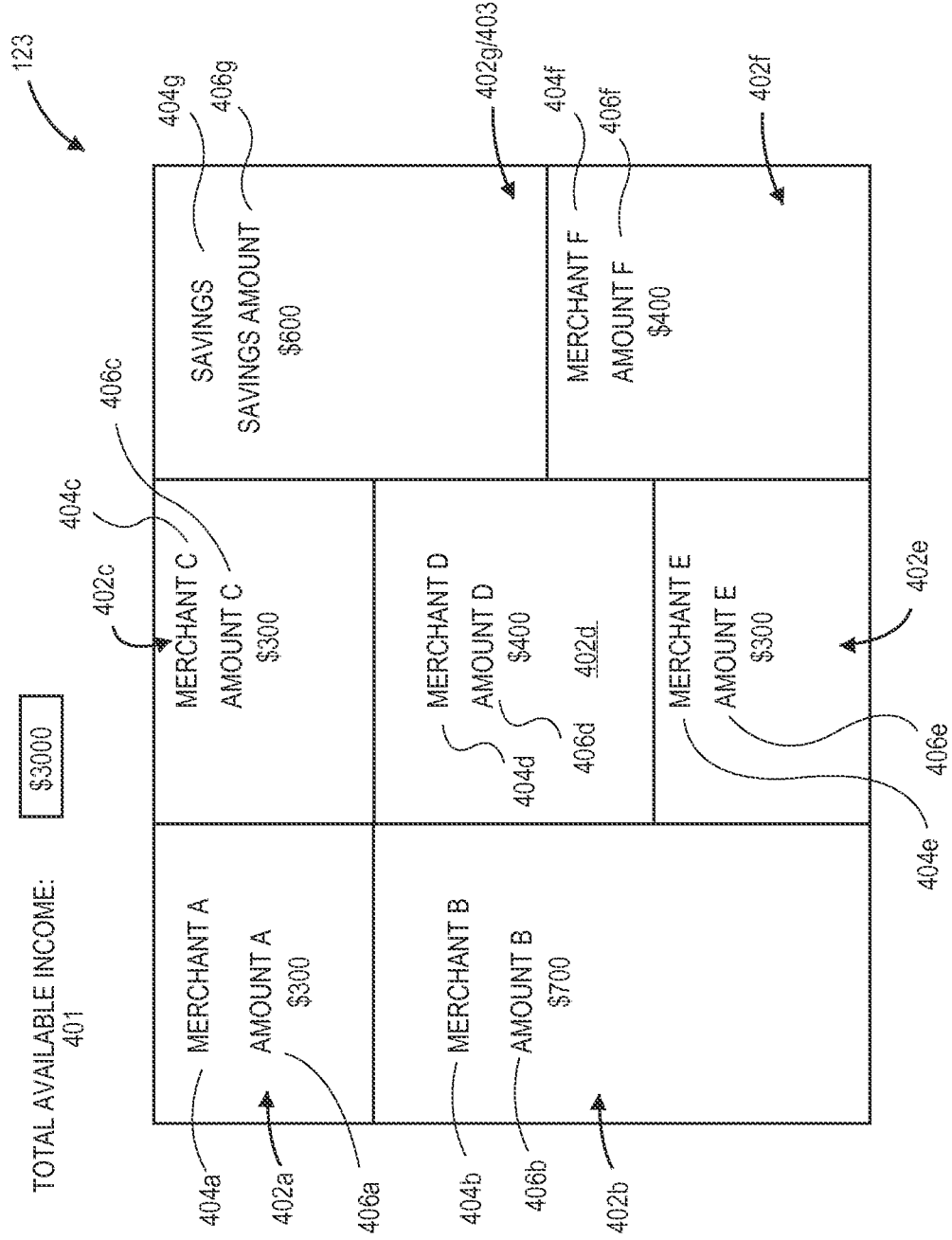
FIG. 4 illustrates one embodiment of a visual representation of a budget having square-like or rectangular shaped budget elements that are arranged to form a square-like or rectangular shaped collection of budget elements, and transaction data being categorized to budget elements that are identified by merchant name.

Referring to FIG. 4, one embodiment of a visual representation 123 of the budget 162 includes a plurality of elements, segments, objects or panels 402 (generally, "budget elements" 402) that are associated with respective labels 404 (such as category, sub-category and merchant name, etc.) and respective amounts 406 of available income 401 to be allocated to the budget elements 402. As shown in FIG. 4, the budget elements 402 have a square or rectangular shape, and the total amount of available income 401 is represented by the sum of the amounts 406 of the budget elements 402, which is related to the total area of the budget elements 402 since each budget element 402 is sized to represent the respective amount 406 of available income 401 allocated to each budget element 402. Thus, a budget element 402 has a larger area or size if more income 401 is allocated to that budget element 402, whereas the budget element 402 has a smaller area if less income 401 is allocated to the budget element 402.

In the embodiment illustrated in FIG. 4, the collection of budget elements 402 indicates that the consumer 110 has $3000 of income 401 to be budgeted, and this amount 401 is allocated among various budget elements 402a-f associated with particular merchants A-F and at least one of the budget elements 402 is a savings element 403. The savings element 403 indicates that the amount of income 401 the consumer 110 intends to save after income 401 is allocated to the budget elements 402. In the illustrated example, $2500 would be allocated for spending at various merchants 150 ($300 to Merchant A, $700 to Merchant B, $300 to Merchant C, $400 to Merchant D, $300 to Merchant E, $400 to Merchant F) and $600 is allocated to savings.

Figure 5:
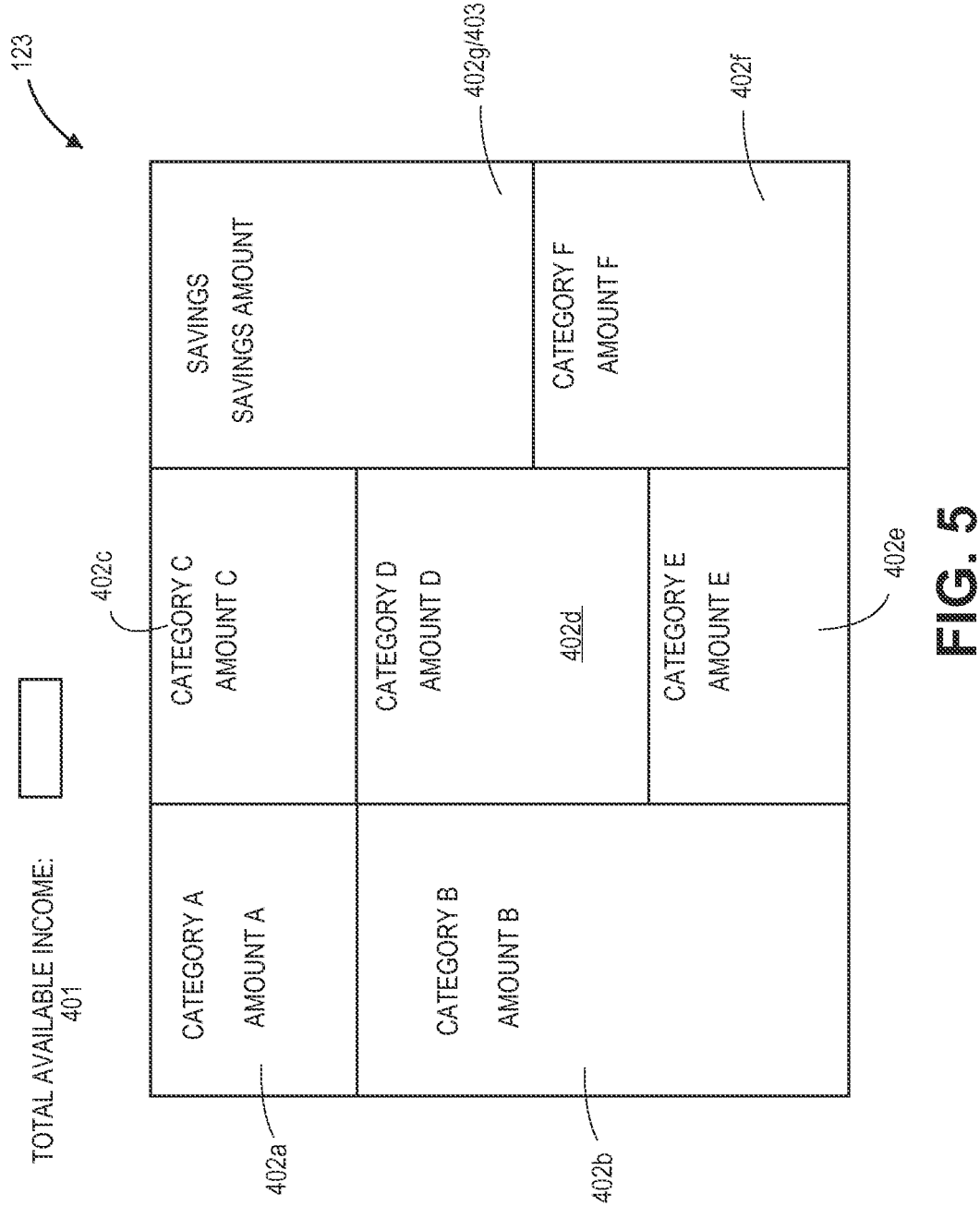
FIG. 5 illustrates one embodiment of a visual representation of a budget having square-like or rectangular shaped budget elements that are arranged to form a square-like or rectangular shaped collection of budget elements, and transaction data being categorized to budget elements that are identified by a type or name of a good or service.

While FIG. 4 illustrates budget elements 402 related to merchants 150, referring to FIG. 5, embodiments may also involve budget elements 402 that correspond to particular categories of merchants 150 or categories of goods 153 (e.g., entertainment) and/or sub-categories (e.g., dining out, movies, etc.). Embodiments may also involve a combination of budget elements 402 that correspond to particular merchants 120 and budget elements 402 that correspond to particular categories or sub-categories.

Figure 6:
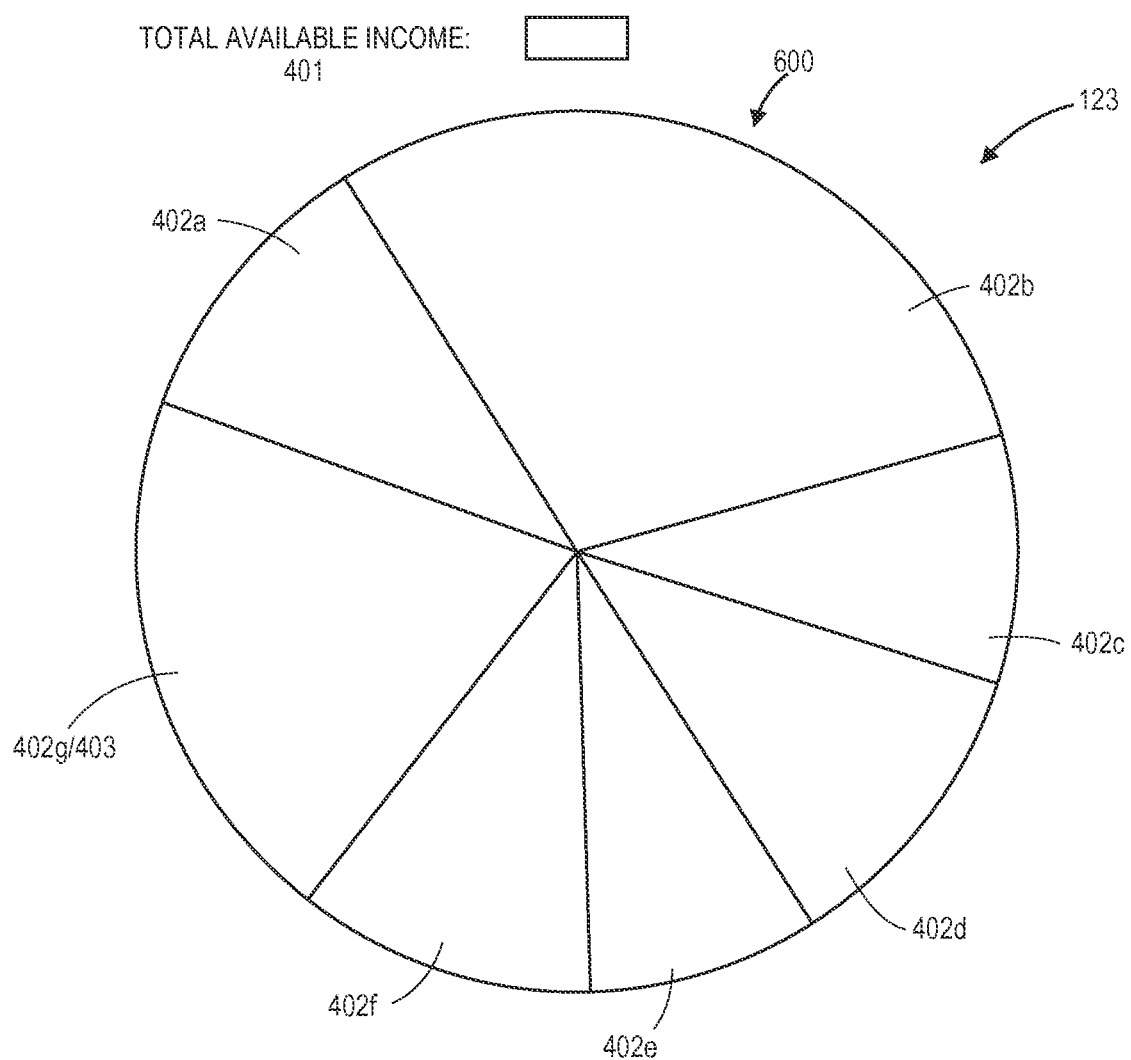
FIG. 6 illustrates one embodiment of a visual representation of a budget having wedge-like budget elements that are arranged to form a circular collection of budget elements.
Figure 7:
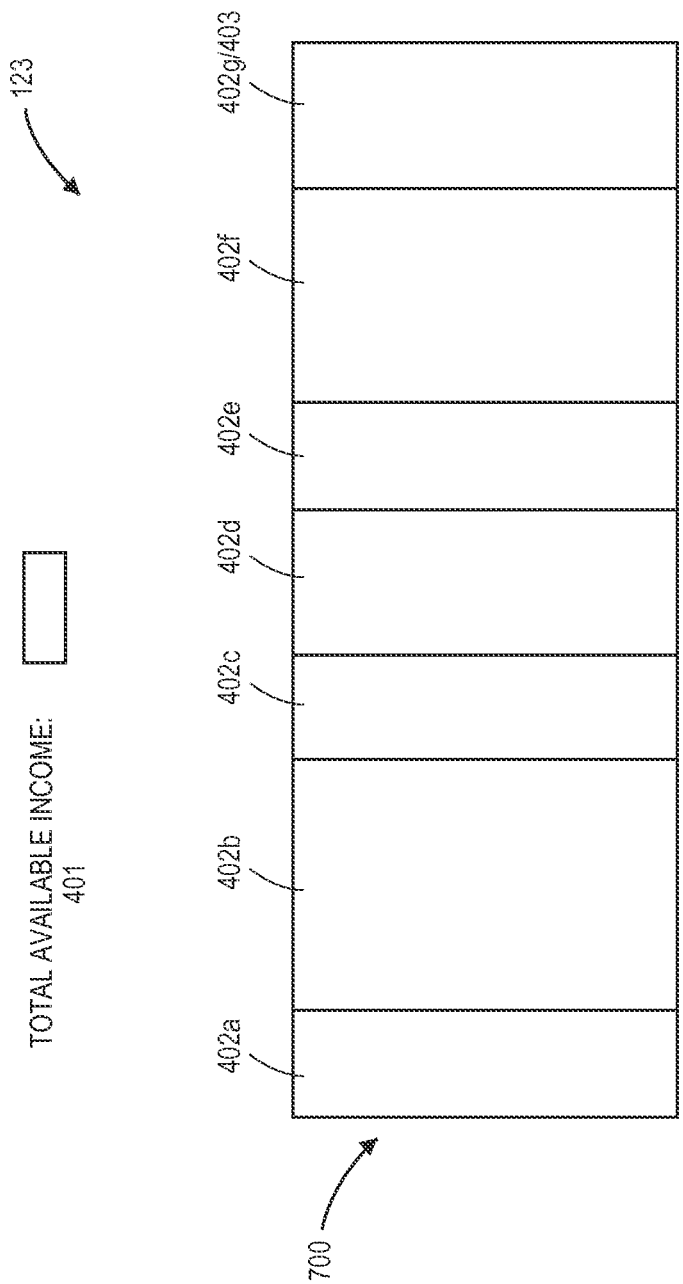
FIG. 7 illustrates one embodiment of a visual representation of a budget having square-shaped or rectangular-shaped budget elements that are arranged in a linear configuration.

Further, it should be understood that while FIGS. 4-5 illustrate budget elements 402 having a square or rectangular shape, other shapes including other block shapes such as "E," "L" and "T" shapes may be utilized, as well as irregular shapes. For example, embodiments may involve budget elements 402 that are grouped together to form a circular or pie shape (as shown in FIG. 6) and linear or rectangular shapes (as shown in FIG. 7) such that the sum of the amounts 406 of budget elements 402 and the savings element 403 represents the amount of available income 401, which is related to the total area of the circle 600 shown in FIG. 6 and the total area of the linear arrangement or rectangle 700 shown in FIG. 7 such that respective sizes of the pie-shaped budget elements 402 and square or rectangular shaped budget elements 402 represent respective amounts 406 of income 401 allocated to each budget element 402. For ease of explanation reference is made to a configuration of budget elements 402 as shown in FIG. 4, but it should be understood that other budget element shapes 402 and configurations of budget elements 402 may be utilized.

Referring again to FIG. 3, at stage 325, the personal finance program 161 is executed to determine an initial budget 162 based on available income 401, categorized transaction data 154 and/or consumer 110 input. At stage 330, an interface comprising a visual representation 123 of the initial budget 162 is generated, and at stage 335, the interface comprising the visual representation 123 is displayed on the screen 122 of the consumer computer 120 as a single page or view.

Figure 8:
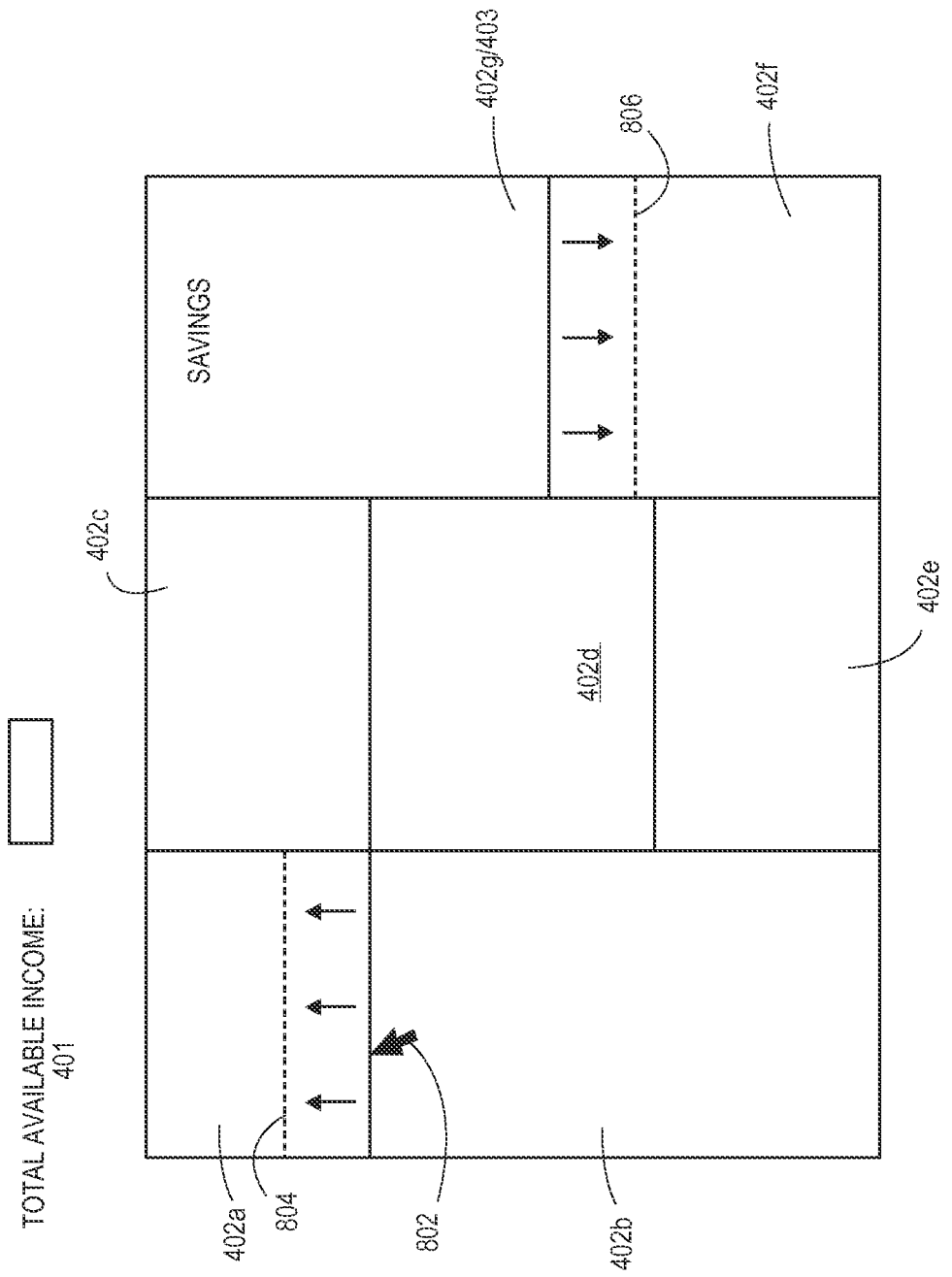
FIG. 8 illustrates selection and re-sizing of a budget element in order to adjust an amount of income allocated to the selected budget element.

With continuing reference to FIG. 3 and with further reference to FIG. 8, at stage 340, the consumer 110 selects a budget element 402 (generally indicated by pointer 802) utilizing a mouse, keyboard or other input device and indicates a desired amount of savings on the selected budget element 402. The desired amount of savings may be indicated in various ways. In one embodiment, a size of the selected budget element 402 is changed (indicated by dotted line 804) to indicate different amounts of income 401 allocated to that budget element 402. For example, the consumer 110 may manipulate a mouse or other input device of the computer 120 to drag a corner of the selected budget element 402 to re-size the budget element 402 as shown in FIG. 8. Reducing the size of the budget element 402 (as shown in FIG. 8) reduces the amount 406 of income 401 allocated to that budget element 402 which, in turn, enlarges the size or area of the savings element 403 and the amount of savings (indicated by dotted line 806). Enlarging the size of the budget element 402 increases the amount of income 401 allocated to that budget element 402 which, in turn, reduces the size of the savings element 403 and the amount of savings. The result is that the size of the selected budget element 402 is changed at stage 345, and the size of the savings element 403 is changed at stage 350 to reflect the changes in the amount of income 401 allocated to the budget elements 402 and the savings element 403.

Figure 9A:
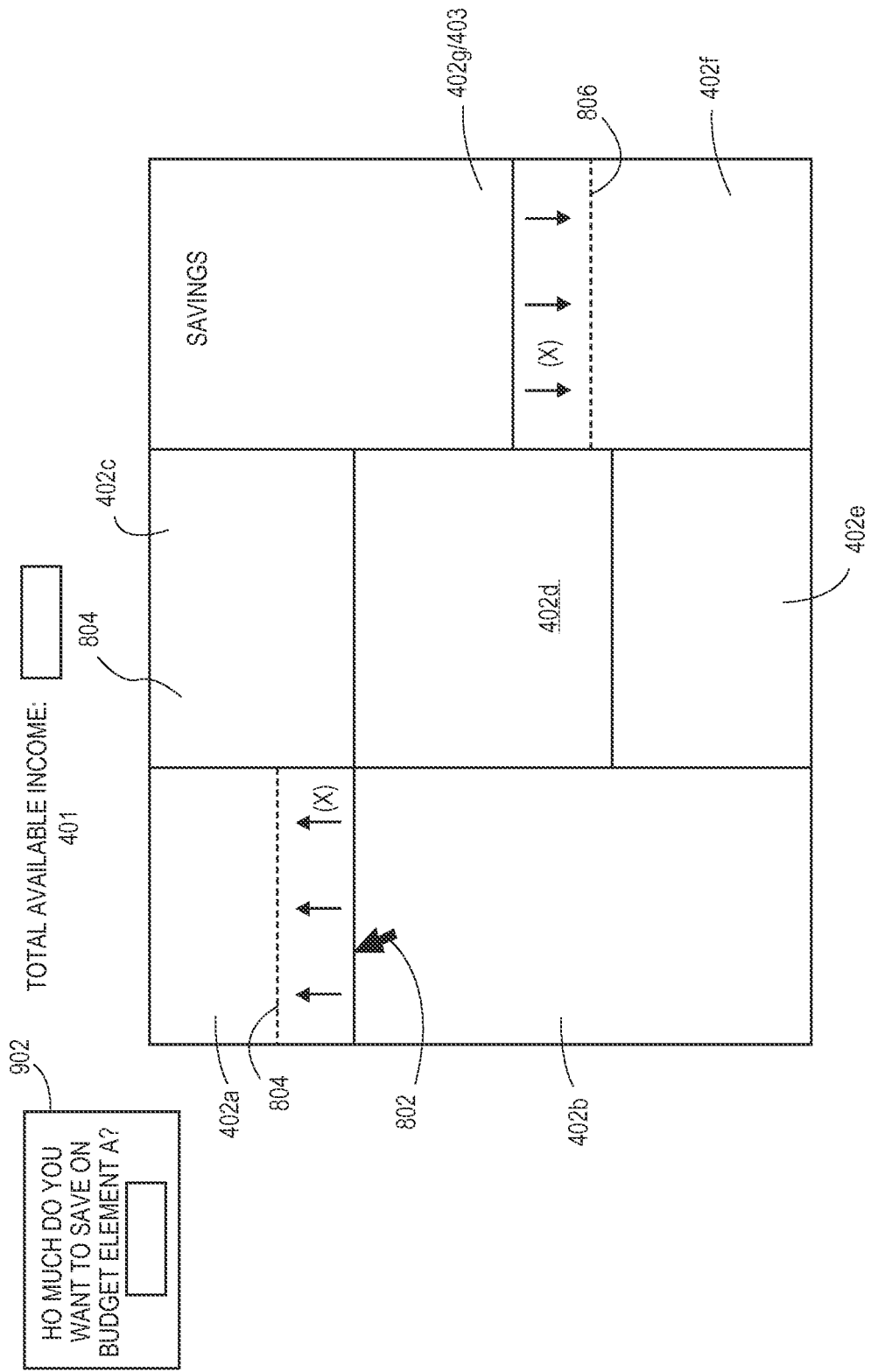
FIG. 9A illustrates generation of a window requesting the consumer to enter an amount to be saved on a budget element and resulting changes to at least one of a size, a shape and a location of the selected budget element and a savings element.

Referring to FIG. 9A, according to another embodiment, selecting a budget element 402 generates a window 902 that includes a message asking the consumer 110 how much the consumer 110 wants to save on the selected budget element 402. The size of the budget element 402 is reduced by a corresponding amount entered into the window 902, and the size of the savings element 403 is also enlarged to reflect increased savings. One or more budget elements 402 illustrated in FIG. 9A may be re-sized, re-shaped and/or repositioned for integration with other budget elements to accommodate these changes.

Figure 9B:
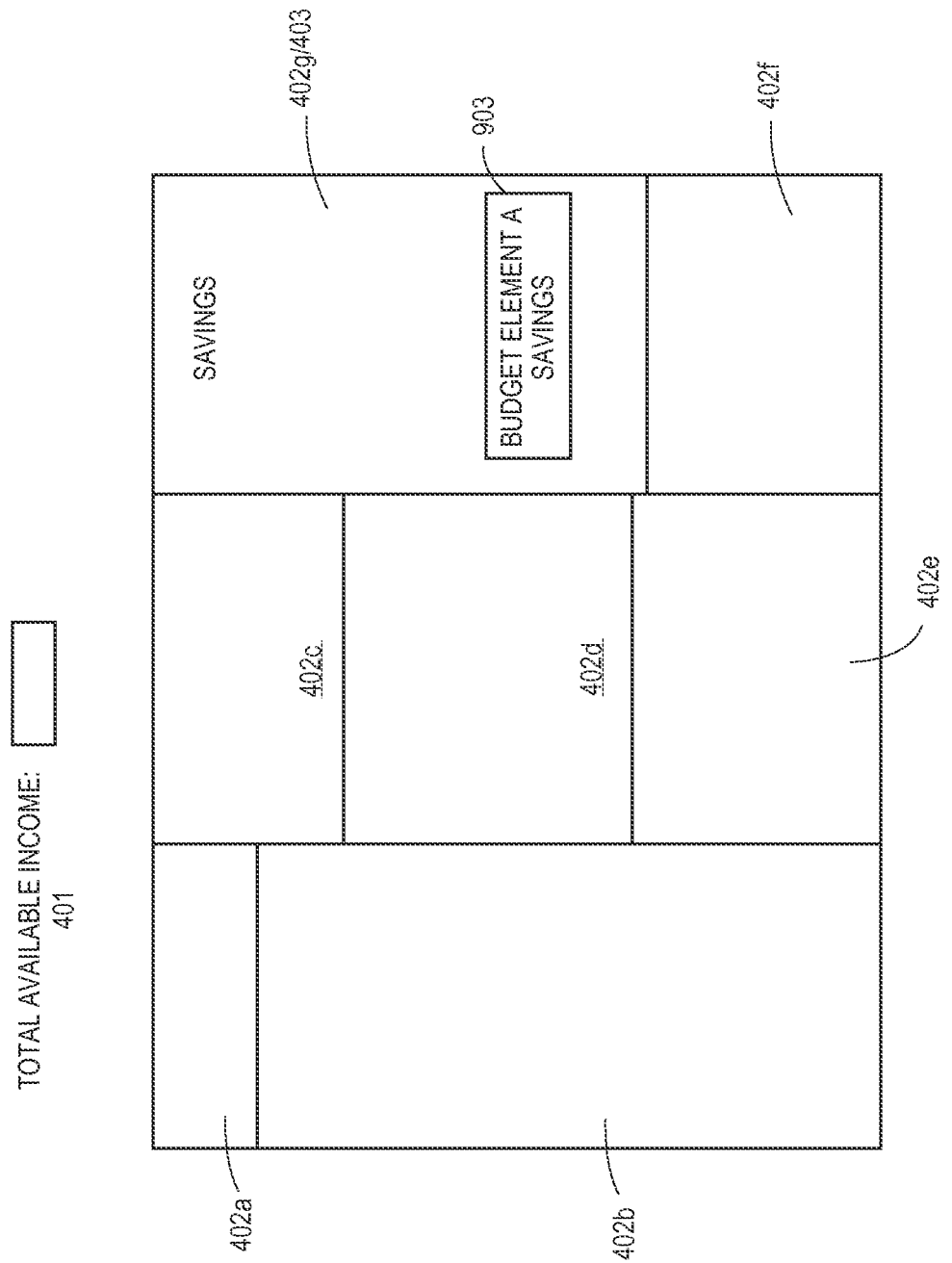
FIG. 9B illustrates generation of a savings sub-element within a savings element to illustrate what portion of the overall savings is attributable to savings on a particular budget element.

Further, as shown in FIG. 9B, at stage 355, a savings sub-element 903 may be generated to indicate a portion of the total savings amount is attributable to savings on the selected budget element 402 as specified as described above. In the illustrated embodiment, the savings sub-element 903 is included within the larger savings element 403. If a savings sub-element 903 already exists, changing the amount allocated to a budget element 402 may result in re-sizing the savings sub-element 903 and savings element 403 accordingly. For example, if budget element 402a related to entertainment, and the consumer indicated that the amount of income to be allocated to entertainment should be reduced from $150 to $100, then the size of budget element 402a would be reduced proportionately to reflect a budget amount of $100, the size of the savings element 403 would be increased to reflect $50 in savings, and a savings sub-element 903 having a size corresponding to $50 may also be generated.

A consumer 110 may select some or all of the budget elements 402 and select savings amounts on some or all of the selected budget elements 402 to generate a revised visual representation 123 of the budget 162. Budget elements 402 that are changed can be merged or integrated into the display by adjusting one or more of a size, a shape and a location or position of one or more budget elements 402 at stage 360 to piece the budget elements 402 together into single view. At stage 365, stages 340-360 can be repeated as necessary to indicate desired savings on one, some or all of the budget elements 402 in order to prepare a final budget 162 at stage 370.

Figure 10:
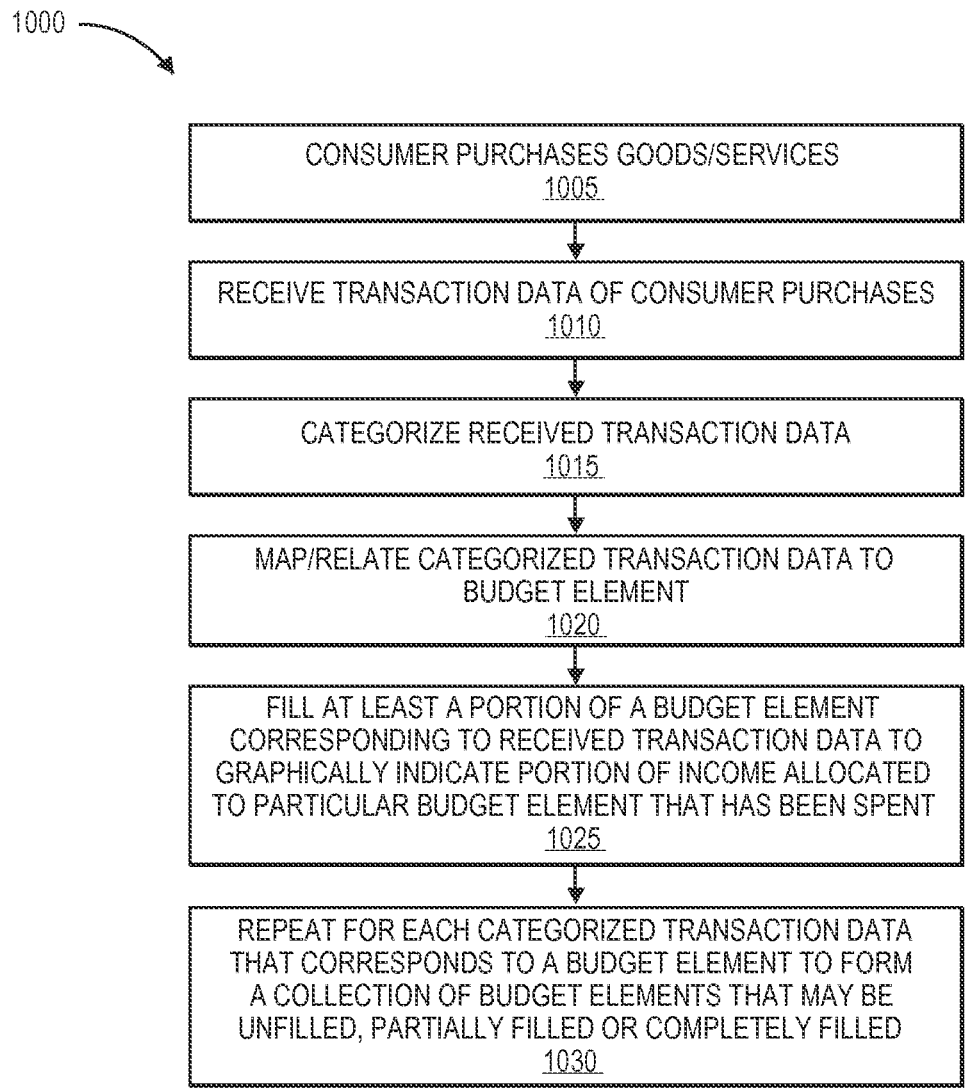
FIG. 10 is a flow diagram of one embodiment of a method of providing a dynamic interface or visual representation for providing budget information to a consumer by at least partially filling budget elements to indicate consumer spending on those budget elements.
Figure 11:
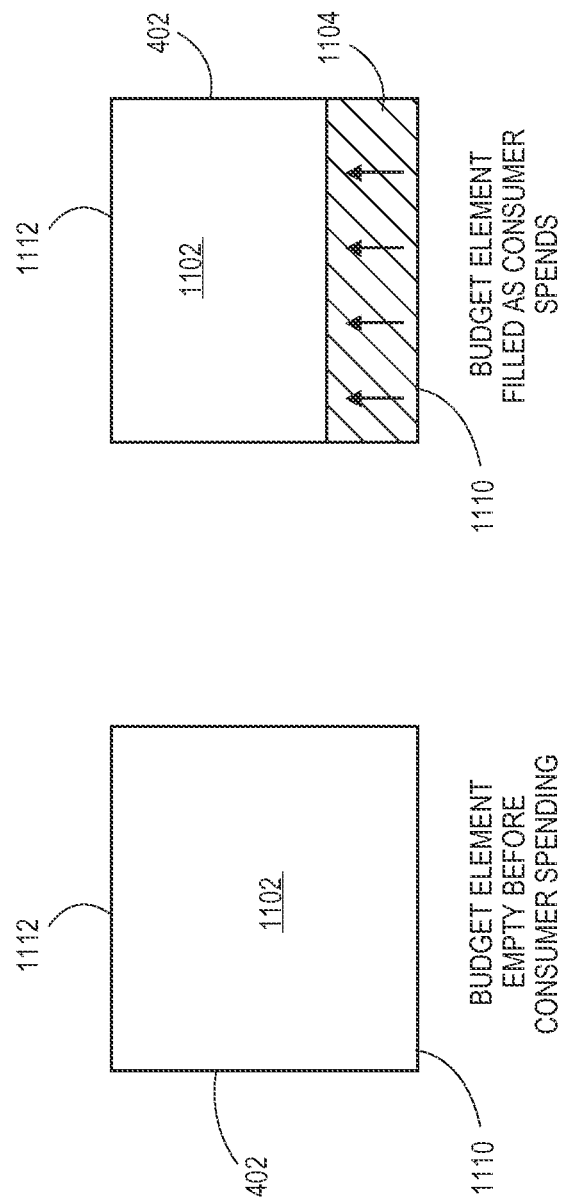
FIG. 11 illustrates one manner in which a budget element can be filled to indicate how much of income allocated to that budget element has been spent by the consumer.

Referring to FIG. 10, after the budget 162 has been prepared or updated as necessary, the consumer 110 purchases goods 153 at stage 1005, and at stage 1010, transaction data 154 of the purchases is received from a transaction data source 130 such as the merchant 150, a financial institution 130a, a host 130b of transaction data 154, or from the consumer 110 if the data 154 is manually entered. At stage 1015, the received transaction data 154 is categorized, e.g., utilizing categorization system and methods described above involving merchant 150 name or identification, a type of good 153 purchased, or codes or identifiers such as SKU or other identification numbers and using various mapping or matching techniques including those described in U.S. Publication No. US 2009/0037461 A1 to Rukonic et al., the contents of which were previously incorporated herein by reference. Transaction data 154 may also be manually categorized by the consumer 110, and the consumer 110 may change a categorization if the consumer 110 does not agree with the initial category assigned or if there is category overlap.

At stage 1020, categorized transaction data 154 is mapped or matched to a budget element 402. As discussed above, embodiments may be structured to have budget elements 402 that match exactly the categories of the categorization program 164. Other embodiments may involve determining how categorized transaction data 154 maps to a budget element 402 if the budget element 402 category and category of transaction data 154 do not match (e.g., based on a table or other relational structure or based on descriptors or terms being synonymous or similar). In both cases, however, the categorized transaction data 154 is linked to a budget element 402.

At stage 1025, and with further reference to FIGS. 11A-B, at least a portion of a budget element 402 corresponding to received transaction data 154 is filled 1104 to graphically indicate portion of income 401 allocated to particular budget element 402 that has been spent by consumer 110, and at stage 1030, these steps are repeated for each received transaction data 154 to determine which budget element 402 should be filled 1104.

In the embodiment illustrated in FIG. 11A, a budget element 402 is initially empty if no income 401 has been spent on the budget element 402. Thus, the empty or unfilled space 1102 of the budget element 402 represents the amount of income 401 that the consumer 110 can spend on the budget element 402 without going over budget 162 on that particular budget element 402. Referring to FIG. 11B, as the consumer 110 purchases goods 153, a corresponding budget element 402 is filled 1104 (indicated by upwardly pointing arrows) to indicate what portion of the allocated income was spent. In the illustrated embodiment, the budget element 402 is filed from the bottom 1110 of the budget element 402 towards the top 1112, similar to the manner in which a container is filled with a liquid. Other embodiments may involve other types of filling 1104, which may also be from side-to-side (e.g., left to right), or outwardly from a center (e.g., when a circle and pie-shaped budget elements shown in FIG. 6 are utilized). The manner in which budget elements 402 are filled 1104 may depend on the shape and configuration of the budget elements 402.

Figure 12:
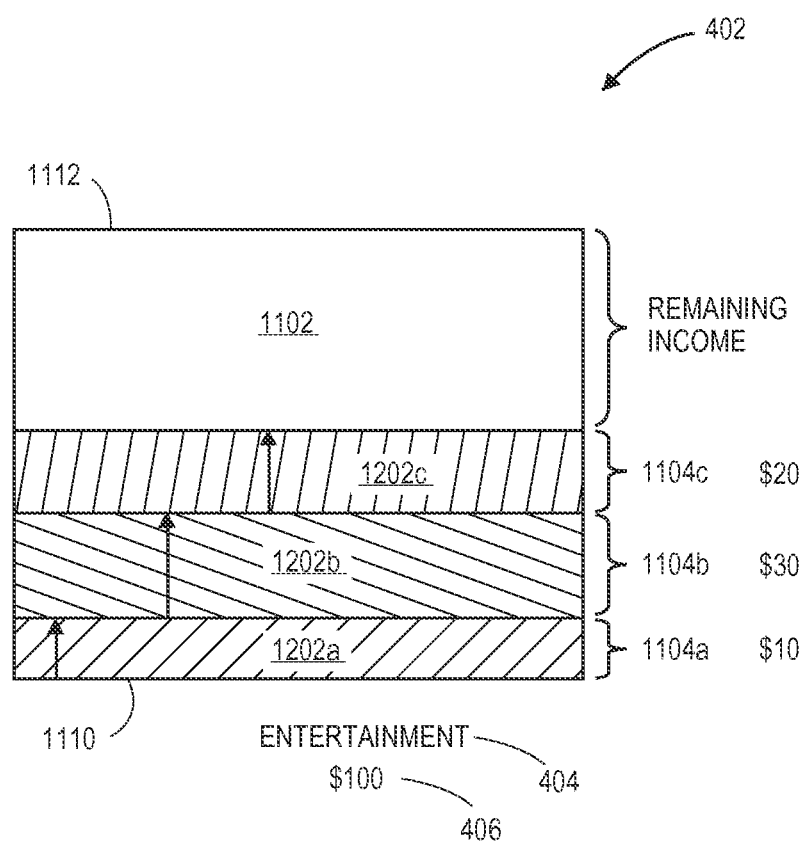
FIG. 12 illustrates one manner in which a budget element can be filled multiple times over time to indicate how much of income allocated to that budget element has been spent by the consumer as a result of multiple purchases.

For example, referring to FIG. 12, $100 may be allocated to a particular budget element 402 labeled "entertainment." Initially, in the illustrated embodiment, no money was spent by the consumer 110 on this particular budget element 402 such that the budget element 402 is initially empty or unfilled 1102. The consumer 110, during a first purchase, spends $10 on DVDs such that the "entertainment" budget element 402 is filled 1104a by a first amount corresponding to area 1202a. A second purchase may involve tickets for a play that cost $30, thereby resulting in filling 1102b the budget element 402 by a second amount corresponding to area 1202b, and a third purchase may involve tickets to a sporting event that cost $20, thereby resulting in filling 1104c the budget element 402 by a third amount corresponding to area 1202c. The age of a transaction can also be indicated by color or other indicator. In the illustrated embodiment, in which three purchases result in three fills 1102a-c, the bottom fill 1102a, representing the first transaction, can be a color or color hue that is darker than the second fill 1102b, which can be a color or hue that is darker than the third fill 1102c representing the most recent transaction. For example, a color scheme of dark to light may be utilized to indicate older transactions (darker hues or colors) and more recent transactions (lighter hues or colors).

Figure 13:
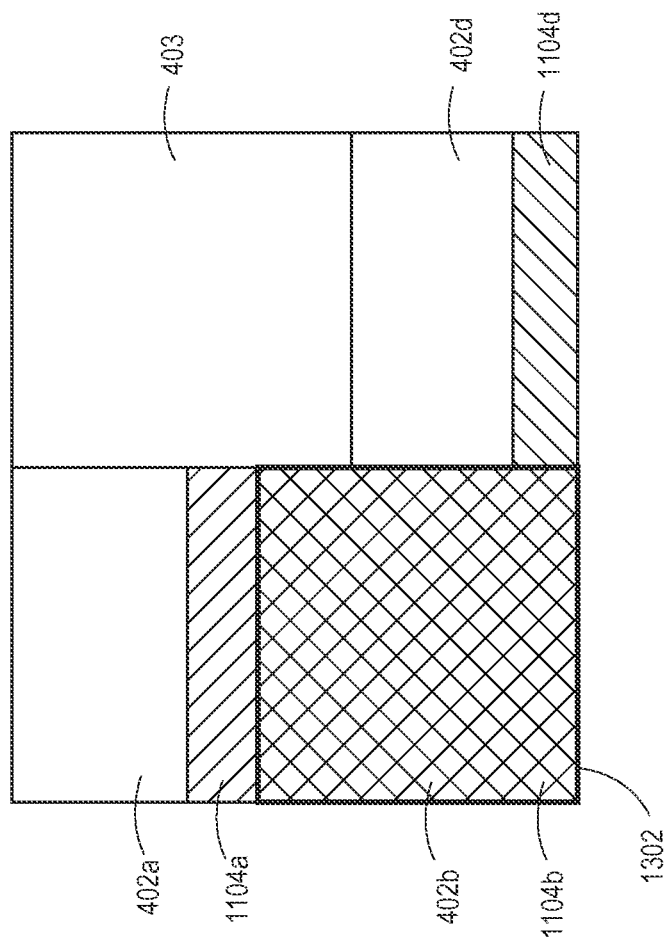
FIG. 13 illustrates one embodiment in which a budget element is emphasized to indicate that spending on the budget element has reached a pre-determined level or has exceeded the budgeted amount.

Thus, depending on the amounts of the transactions, a budget element 402 may never be filled (in which case the consumer 110 is under budget and has additional savings), partially filled (as shown in FIG. 12, in which case the consumer 110 is under budget and has additional savings), or completely filled, in which case the consumer 110 may be at or over the amount 406 of that budget element 402). Spending more than a budget amount 406 may be indicated by emphasizing 1302 the corresponding budget element 402 (as illustrated in FIG. 13). Emphasis may involve the budget element 402 bulging relative to other budget elements, thicker budget element 402 boundaries or color.

Figure 14A:
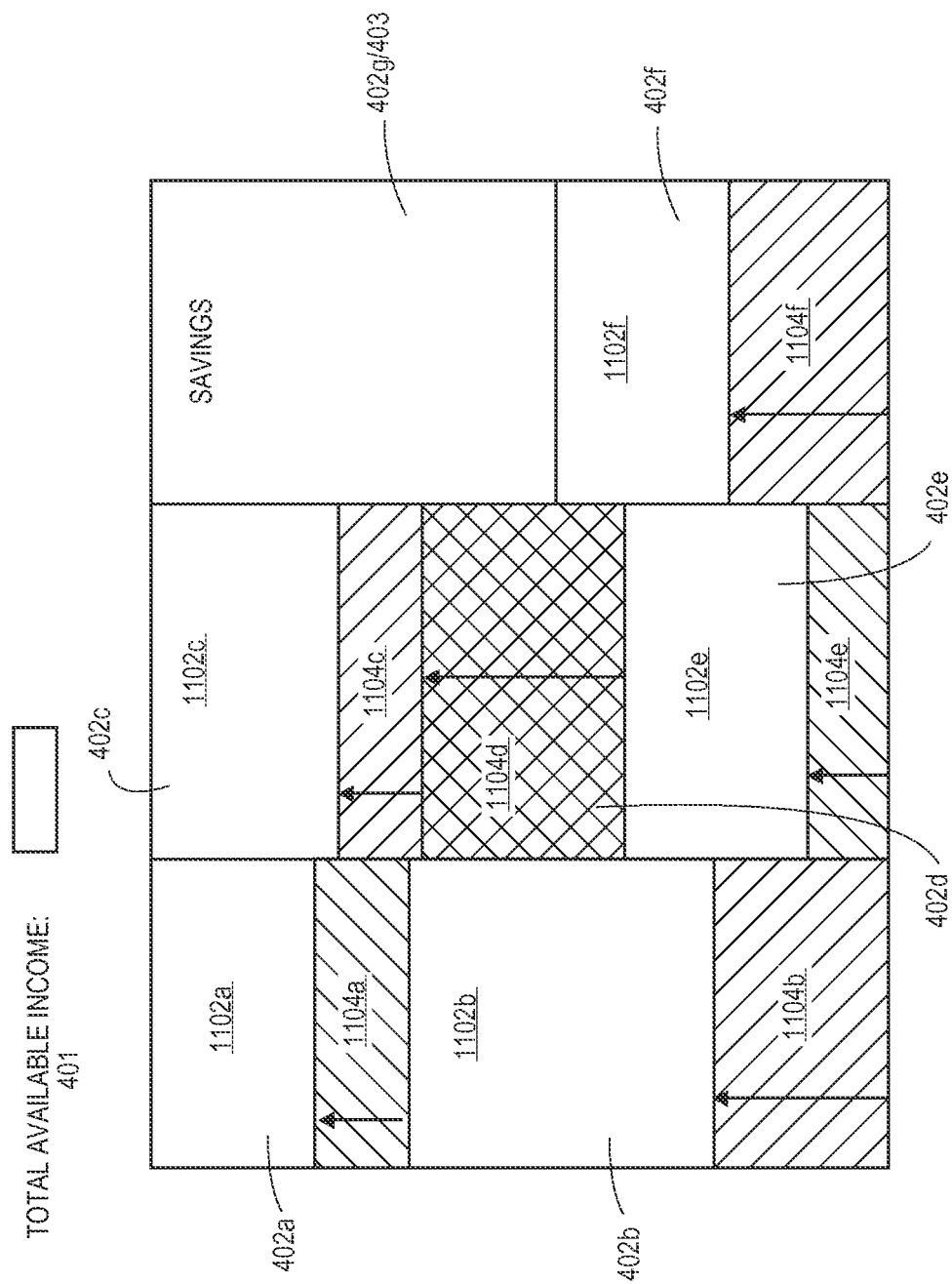
FIG. 14A illustrates one embodiment of a visual representation of a budget having square-like or rectangular shaped budget elements, some of which are partially or completely filled as a result of consumer spending.
Figure 14C:
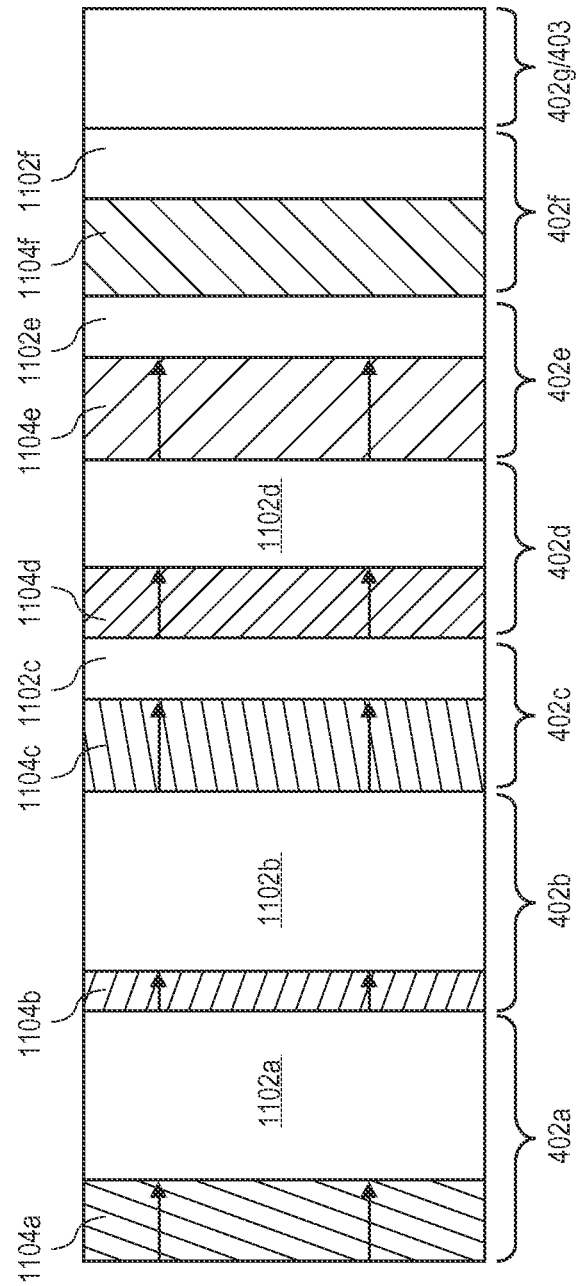
FIG. 14C illustrates one embodiment of a visual representation of a budget having a linear collection of square-like or rectangular shaped budget elements that are partially or completely filled as a result of consumer spending.

Thus, with embodiments, as the consumer 110 spends income 401 on various budget elements 402, the visual representation 123 of the budget 162 is dynamically adjusted as a result of budget elements 402 being filled 1104 due to the consumer 110 spends income 401 as shown in FIGS. 14A-C. The consumer 110 is thus provided with a composite view of multiple budget elements 402, which may be within a single screen or view, and is also shown how much income allocated to those budget elements 402 has been spent and how much the income has been saved.

Figure 15:
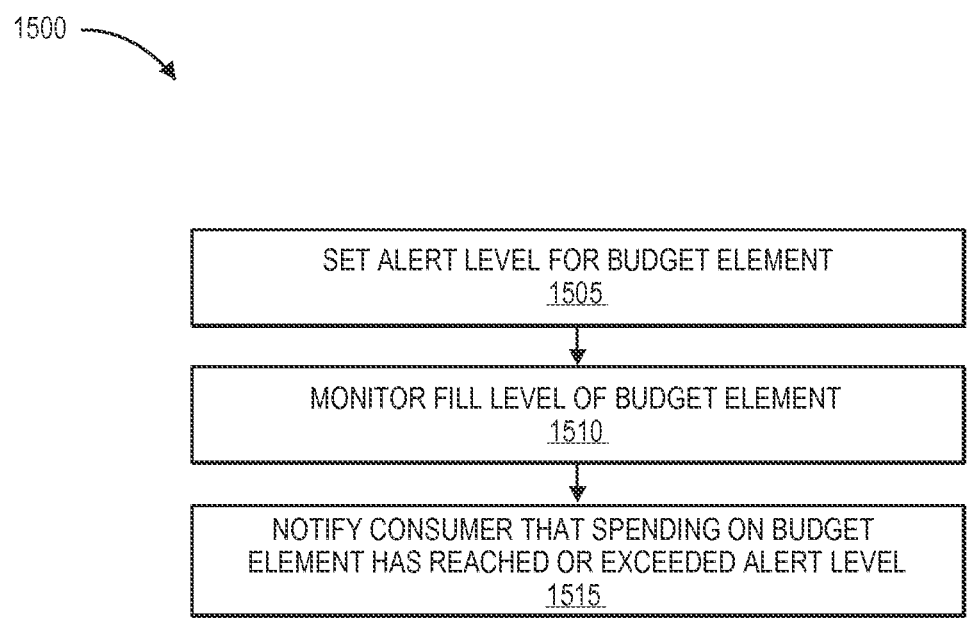
FIG. 15 is a flow diagram illustrating a method of informing a consumer about spending on a budget element.
Figure 16:
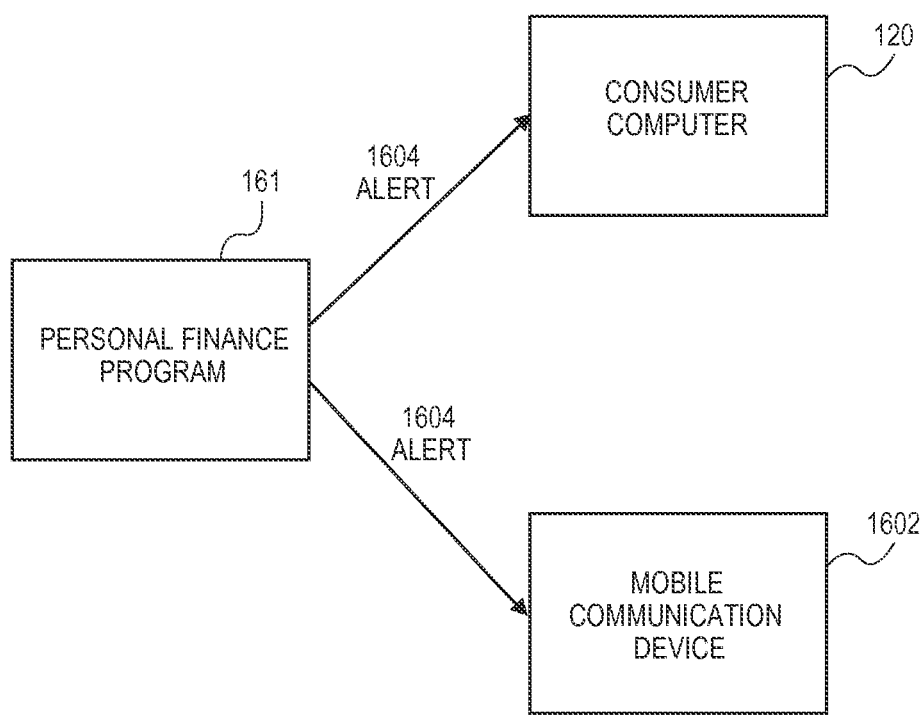
FIG. 16 illustrates how a personal finance program can be configured to send a message or notice to a computing or mobile communication device of the consumer.

Referring to FIGS. 15-16, in certain embodiments, the personal finance program 161 is operable to send a message or alert 1604 to the consumer 110, e.g., to the consumer computer 120 or to a mobile communication device 1620 such as a smartphone or cellular telephone of the consumer 110. For example, referring to FIG. 15, at stage 1505, the consumer 110 may set an alert level for a budget element 402, and at stage 1510, spending on the budget element 402 is monitored by the personal finance program 161. At stage 1515, and with further reference to FIG. 16, the consumer 110 is notified that spending on that budget element 402 is at or has exceeded the pre-determined alert level. The personal finance program 161 may be operable to send a text or SMS, e-mail or other message 1604 to the consumer computer 110 or to a mobile communication device 1602 such as a cellular telephone, Smartphone and other mobile computing or communication device 1602 (generally, mobile communication device) of the consumer 110.

Figure 17:
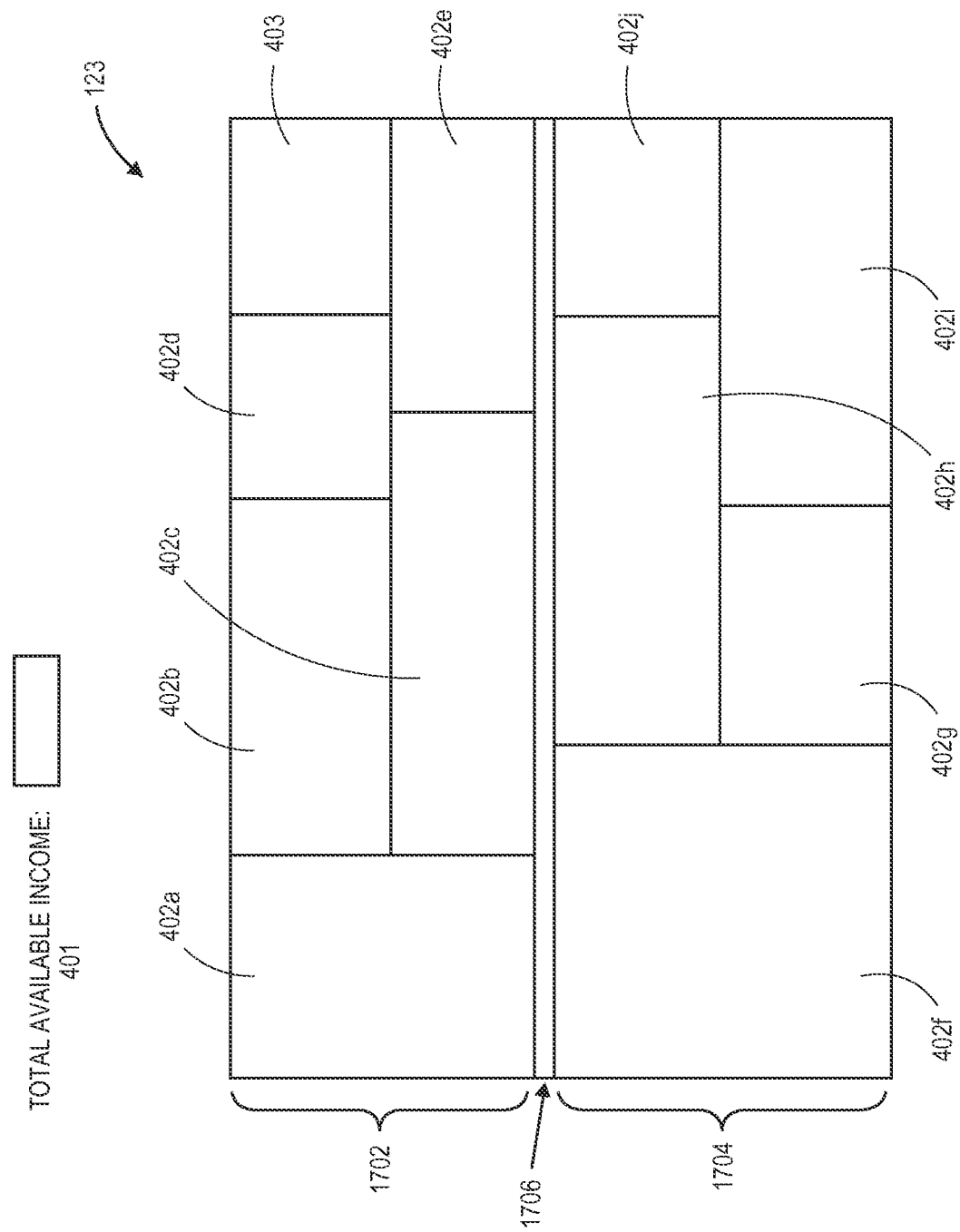
FIG. 17 illustrates another embodiment of a visual representation of a budget having square-like or rectangular shaped budget elements that are arranged to form a square-like or rectangular shaped collection of budget elements that are divided into discretionary and non-discretionary budget elements.

Referring to FIG. 17, in another embodiment, the budget elements 402 are arranged according to whether they represent discretionary spending 1702 or non-discretionary spending 1704. Discretionary spending 1702 is defined to refer to optional spending or spending on items other than basic living items or necessities, whereas non-discretionary spending 1704 is defined to refer to spending on basic living items or necessities.

Examples of non-discretionary budget elements 1704 may include payments for required living items, necessities or legally required items (such as automobile insurance) such as "Rent," "Groceries" (or a basic food allotment) "Utilities" (such as gas, electric, water) "Gas/Transportation" (such as a car payment, gasoline, and other travel expenses) "Minimum Credit Card Payments (ND)" (e.g., a minimum amount due without resulting in a late fee) and "Savings for Insurance." Examples of discretionary budget elements 1702 include "Credit Card Payments Over Minimum (D)" (i.e., credit card payments in excess of the minimum amount due) "Dining Out" (dining out in excess of required groceries) "Entertainment," "Loan Repayment to Mom" (in the event that the consumer is provided some flexibility regarding when the loan is to be repaid) "Cigarettes," "Groceries" (beyond the non-discretionary or required groceries) "Coffee" and "Savings." Whether a budget element 402 is discretionary or non-discretionary can be determined by the consumer 110 or by the personal finance program 161. In the illustrated embodiment, Credit Card Payments Over Minimum (D)," "Dining Out," "Entertainment," "Loan Repayment to Mom," "Cigarettes," "Groceries," "Coffee" and "Savings." A divider 1706 or other indicator may be utilized to differentiate discretionary budget elements 1702 and non-discretionary budget elements 1704.

Figure 18A:
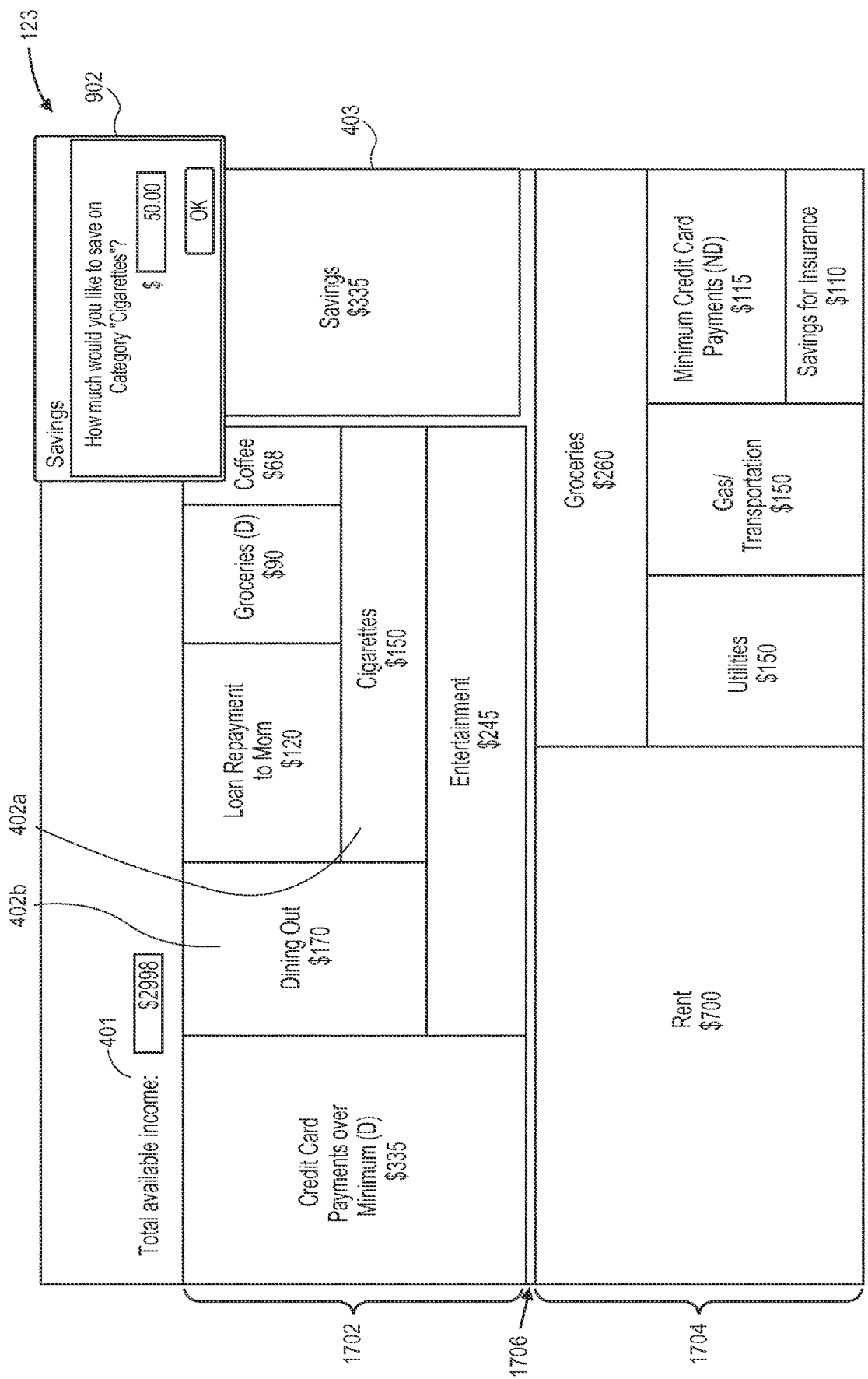
FIG. 18A one manner in which embodiments illustrated in FIG. 17 may be implemented and a visual representation of a budget having discretionary and non-discretionary budget elements.

Visual representations 123 shown in FIG. 18A allows a consumer 110 to visualize additional budget 162 details and analyze discretionary and non-discretionary spending, which is particularly beneficial since discretionary budget elements 1702 present a greater opportunity for savings since the consumer 110 can reduce spending more easily on discretionary budget elements 1702 compared to non-discretionary budget elements 1704.

Figure 18B:
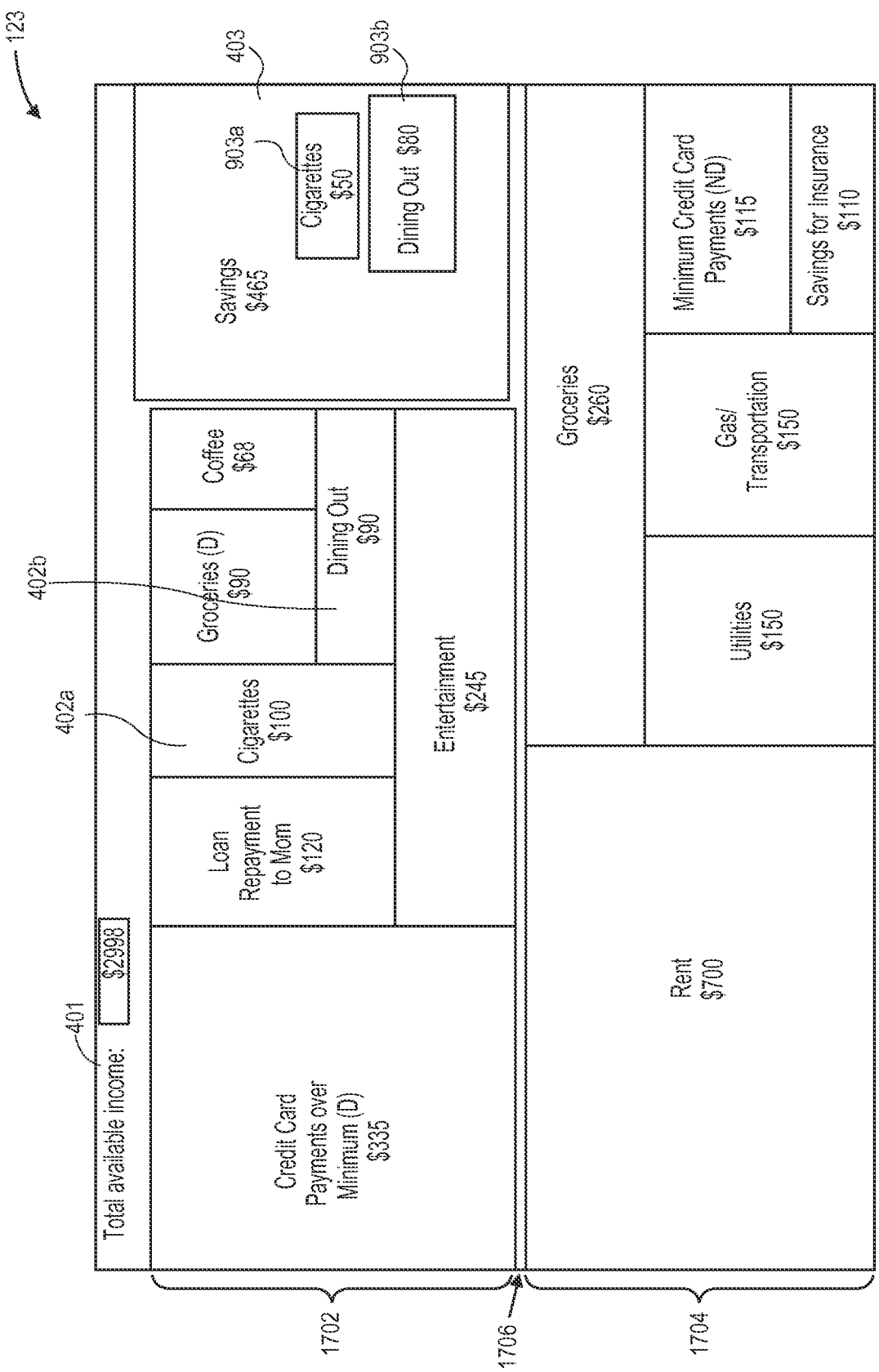
FIG. 18B illustrates how a consumer may adjust amounts of income allocated to various budget elements shown in FIG. 18A.
Figure 18C:
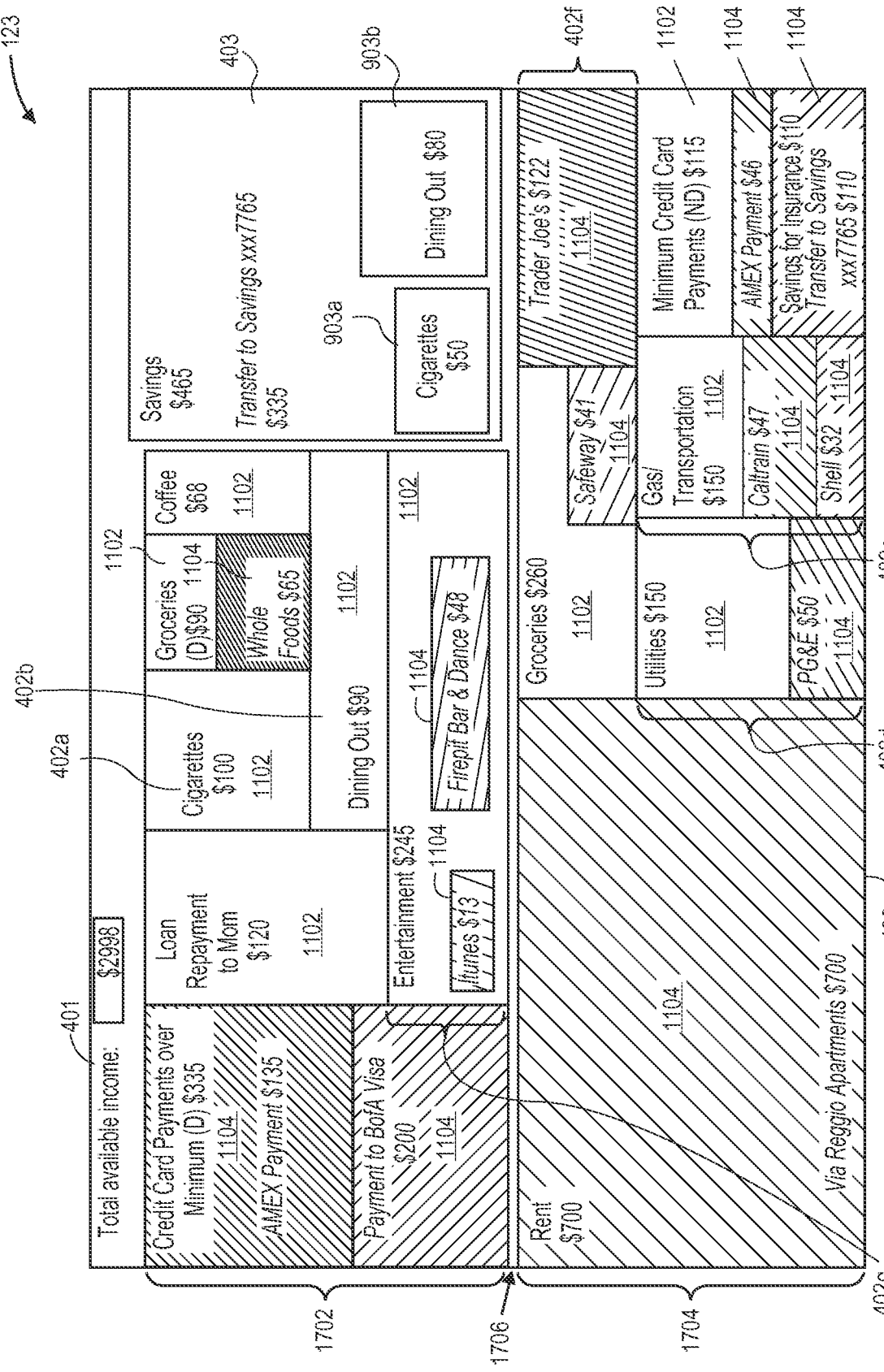
FIG. 18C illustrates how budget elements shown in FIG. 18B are dynamically filled as a consume spends income on goods and services that correspond to respective budget elements.

FIGS. 18A-C illustrate one example of how embodiments generally illustrated in FIG. 17 may be implemented. Referring to FIG. 18A, a visual representation 123 of a budget 162 has been prepared, and a top half of the visual representation 123 includes categories of discretionary budget elements 1702, or budget elements that represent optional spending, and a bottom half of the visual representation 123 includes categories of non-discretionary budget elements 1704 or required budget elements that represent fixed spending or spending with little or no flexibility.

In the illustrated embodiment, the amount of income 401 to be budgeted and allocated to budget elements 402 and a savings element 403 is $2,998 and is represented by the collection of budget elements 402 and the savings element 403. Sizes of respective budget elements 402 represent respective amounts 406 of income 401 allocated to the budget elements 402. Thus, as shown in FIG. 18A, a largest portion of the available income 401 is allocated to rent ($700), which has the largest size or area, whereas the smallest amount of income 401 is allocated to coffee ($68), which has the smallest size or area. The sizes of respective budget elements 402 represent the respective amounts 406 of income 401 allocated to the budget elements 402.

FIG. 18A represents an initial budget 162, e.g., as determined by the consumer 110 or generated by the personal finance program 161 based on currently available transaction data 154. FIG. 18A also illustrates the consumer 110 selecting the "Cigarettes" budget element such that the budget visualization program 166 generates a window 902 asking the consumer 110 how much the consumer 100 would like to save on cigarettes. In this example, the initial amount 406 of income 401 allocated to cigarettes is $150, and the consumer 110 has indicated in the window 902 that it is desired to save $50 on cigarettes, i.e., $50 should be saved by not spending $50 on cigarettes. Similar adjustments can be made to other budget elements (such as "Dining Out" as shown in FIG. 18B) to indicate how much is to be saved on various budget elements 402. In one embodiment, spending on discretionary budget elements 1702, and thus, saving on discretionary budget elements 1702 resulting from not spending on discretionary budget elements 1702, can be adjusted by the consumer, but non-discretionary budget elements 1704 are fixed and cannot be adjusted or can be adjusted in a limited manner such that non-discretionary budget elements 1702 are easier to adjust than discretionary budget elements 1704. This may ensure that the consumer 110 has allocated sufficient income 401 to cover basic living expenses such as rent, utilities, groceries, etc.

As a result, referring to FIGS. 18A-B, the consumer 110 has indicated that it is desired to save $50 on cigarettes which, in turn, reduces the size of the "cigarettes" budget element 402*a* from a first size representing $150 allocated to cigarettes (as shown in FIG. 18A) to a smaller size that represents $100 allocated to cigarettes (as shown in FIG. 18B). Further, a savings sub-element 903*a* for "cigarettes" is included in the larger savings element 403 to illustrate what portion of the total savings ($465 in this example) is attributable to the $50 savings on cigarettes. In the illustrated embodiment, not only did the size of the "cigarette" budget element 402*a* and the savings element 403 change, but the location and shape of the "cigarette" budget element 402*a* also changed in order to integrate the smaller "cigarette" budget element 402*a* within other budget elements 402 to form the visual representation 123. Specifically, in the illustrated embodiment, the "Cigarettes" budget element 402 originally had a square-like shape and was located at the top of the visual representation 123 (FIG. 18A). However, after the "Cigarettes" budget element 402*a* was reduced by the consumer 110 indicating a savings amount on cigarettes, the "Cigarettes" budget element 402*a* was proportionately reduced in size and, in addition, was re-shaped and re-located within the visual representation 123. It should be understood that budget elements 402 may be re-sized, re-shaped and/or repositioned for integration with other budget elements 402.

Similarly, the consumer 110 has indicated that it is desired to save $$80 on a discretionary "dining out" budget element 402*b* which, in turn, reduces the size of the "dining out" budget element 402*b* from a first size representing $170 allocated to dining out (as shown in FIG. 18A) to a smaller size representing $90 allocated to dining out (as shown in FIG. 18B). Further, as shown in FIG. 18B, a second savings sub-element 903*b* for "dining out" is included in the larger savings element 403 to illustrate what portion of the total savings ($465) is attributable to the $80 savings on dining out. The "Dining Out" budget element 402*b* has also been re-shaped and repositioned. In FIG. 18A, the "Dining Out" budget element 402*b* had a height greater than its width and was located on a left side of the "Cigarettes" budget element 402*a*, but after the adjustment, the "Dining Out" budget element 402*b* has rectangular shape in which the width is substantially greater than its height, and the "Dining Out" budget element 402*b* is located below the "Cigarettes" budget element 402*a*. While FIGS. 18A-B illustrates adjustments to two budget elements 402*a,b*, it should be understood that the consumer 110 may indicate desired savings on various types and numbers of budget elements 402. Further, while FIGS. 18A-B illustrates adjustments to discretionary spending on cigarettes and dining out, it should also be understood that embodiments may provide for some adjustment to non-discretionary budget elements 1704.

Once the budget 162 and adjustments are finalized, the consumer 110 is ready to track spending relative to the budget 162, and the consumer 110 will proceed to spend income 401 on various goods 153. The personal finance program 161 receives and categorizes related transaction data 154 and maps categorized transaction data 154 to a budget element 402. In the illustrated embodiment, the consumer 110 spent income on various goods such that some, but not all, of the budget elements 402 are at least partially filled.

For example, the consumer 110 already paid rent such that the non-discretionary "rent" budget element 403*a* is filled 1104 to indicate that all of the income allocated to rent has already been spent by the consumer. As another example, the consumer paid $50 for PG&E (utilities) such that a first portion of the "Utilities" budget element has been filled 1104 to indicate that the consumer has already spent $50 of the allocated $150 on utilities (paid to PG&E). As yet another example, a non-discretionary budget element 402 for "Gas/Transportation" has been partially filled 1104 as a result of the consumer 110 purchasing gasoline ($32 to Shell) and partially filled 1104 as a result of the consumer 110 purchasing a ticket from Caltrain ($47) such that the empty or unfilled space 1102 indicates that the consumer 110 has not yet gone over budget on "Gas/Transportation" and that the consumer 110 can spend another $71 on this budget element 402. Further, $260 was allocated to non-discretionary groceries 402*f*, and so far, the consumer 110 has spent $41 at Safeway and $122 at Trader Joe's such that transaction data 154 from these purchases results in the "Groceries" budget element 402*f* being partially filled 1104. FIG. 18C shows grocery purchases from Whole Foods, which are categorized as non-discretionary spending such that the consumer has already spent $65 of $90 of non-discretionary grocery spending, which is indicated by the non-discretionary "Groceries" budget element being partially filled. As another example, $245 was allocated to a discretionary "Entertainment" budget element 402*g*, and the consumer has spent $13 on iTunes and $48 on Firepit Bar & Dance such that portions of the "Entertainment" budget element 402*g* are filled 1104 to indicate portions of the $245 that have already been spent, whereas the remaining portions of the "Entertainment" budget element 402 are empty or not filled 1102 to indicate what portion of the allocated income 401 has not yet been spent.

Thus, as shown in FIGS. 18A-C, as the consumer 110 spends, respective budget elements 402 will be at least partially filled to indicate portions of the amounts 406 of income 401 that have been spent on those budget elements 402. Embodiments may involve various numbers of budget elements 402, e.g., five, ten, twenty and other numbers of budget elements 402. Embodiments provide a consumer 110 with a snapshot of a budget 162, which may be within a single view or screen on a computer 120, to allow the consumer 110 to quickly and easily determine how spending relates to a budget 162 while budget elements 402 are filled 1104 in a dynamic manner to graphically indicate consumer spending on particular budget elements 402.

Figure 19:
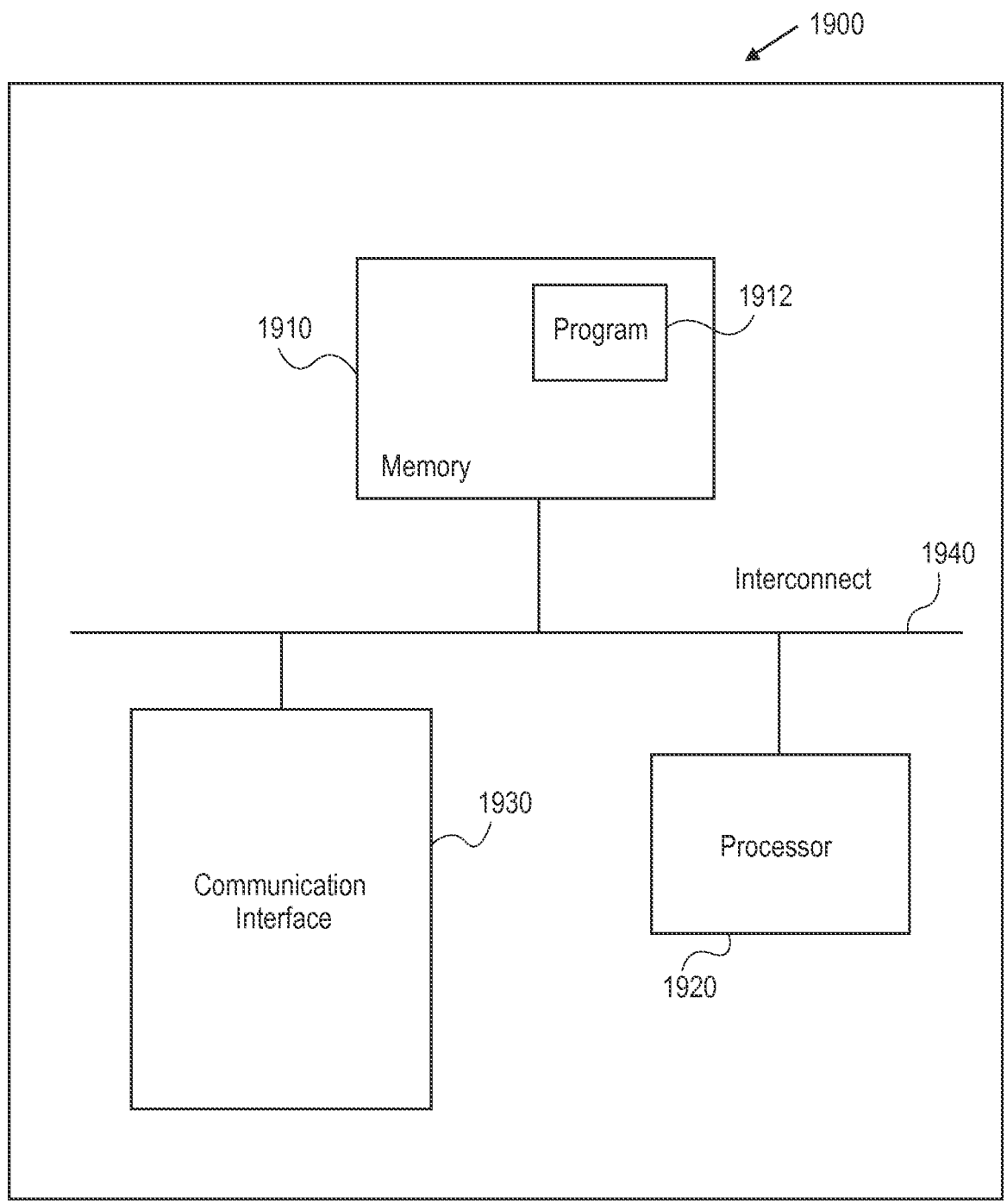
FIG. 19 is a block diagram of components of a computing apparatus or system in which various embodiments may be implemented or that may be utilized to execute various embodiments.

FIG. 19 generally illustrates components of a computing device 1900 that may be utilized to execute embodiments and that includes a memory 1910, account processing program instructions 1912, a processor or controller 1920 to execute account processing program instructions 1912, a network or communications interface 1930, e.g., for communications with a network or interconnect 1940 between such components. The memory 1910 may be or include one or more of cache, RAM, ROM, SRAM, DRAM, RDRAM, EEPROM and other types of volatile or non-volatile memory capable of storing data. The processor unit 1920 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1940 may include a system bus, LDT, PCI, ISA, or other types of buses, and the communications or network interface may, for example, be an Ethernet interface, a Frame Relay interface, or other interface. The network interface 1930 may be configured to enable a system component to communicate with other system components across a network which may be a wireless or various other networks. It should be noted that one or more components of computing device 1900 may be located remotely and accessed via a network. Accordingly, the system configuration provided in FIG. 19 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1920 performs steps or executes program instructions 1912 within memory 1910 and/or embodied on the carrier to implement method embodiments. Further, embodiments may reside and execute on a mobile communication device 1602 such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference to budget elements of certain shapes, it should be understood that other shapes may be utilized, and that budget elements may be integrated or merged together into a composite view in various ways, e.g., utilizing an algorithm to determine a best fit and proportionately adjusting sizes of budget elements to achieve the best fit for a single or composite view. Further, certain embodiments may distinguish discretionary and non-discretionary budget elements and provide certain restrictions on changing non-discretionary budget elements whereas other embodiments may not.

Further, it should be understood that various aspects of embodiments can be combined in different ways in order to provide a visual representation of a budget according to embodiments. For example, embodiments may involve proportional sizes of budget elements that represent respective amounts of income allocated to respective budge elements, fillable budget elements, a combination of sizable and/or fillable budget elements and a savings element that changes in response to changes of budget elements, and various combinations thereof.

Embodiments may be utilized with transaction data from one or multiple sources and may be used to track spending on various types of goods and services that are paid for by the consumer utilizing various types of payment including credit card, debit card, check, electronic check, ATM, ACH and other types of electronic transactions, and transaction data may also reflect cash purchases and paper receipts.

Moreover, it should be understood that consumers who utilize embodiments may be individual consumers and other types of consumers such as corporate and government entities.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. An interactive computer interface for providing a graphical representation of a budget of a user, the graphical representation comprising a plurality of budget elements displayed within a composite view and collectively defining the budget,
   wherein respective sizes of respective areas defined by respective budget elements represent respective amounts of user income allocated to spending towards respective budget elements,
   wherein a total area collectively defined by the plurality of budget elements represents total income for the budget,
   wherein at least one of the budget elements comprises a savings element indicating a target savings amount and including a savings sub-element corresponding to a savings amount derived from forgoing spending on one or more discretionary budget items represented as respective areas within respective budget elements within the graphical representation,
   wherein respective sizes of respective areas of the savings element and the savings sub-element are adjusted dynamically based at least in part upon a user determining a change of an amount of income allocated to particular budget elements,
   wherein the size of the area defined by the savings sub-element within the savings element illustrating how much of the target savings amount is due to savings resulting from forgoing spending on the discretionary budget items represented by the particular selected budget element; and
   the interactive computer interface presenting all budget elements in the graphical presentation as being integrated into the composite view based upon an algorithm for determining the layout of the budget elements.

2. The computer interface of claim 1, further comprising a window generated in response to the user selecting one of the budget elements, the window allowing for entry by the user of a desired amount of savings on the selected budget element.

3. The computer interface of claim 2, wherein at least one particular budget element is associated with a first amount of income, and selected to change the first amount of income to a second amount of income in response to entry by the user of the desired amount of savings on the selected budget element.

4. The computer interface of claim 1, wherein respective sizes of respective areas of the at least one particular budget element, the savings element and the savings sub-element change based at least in part upon a change of the amount of income allocated to the at least one particular budget element, the re-sized at least one particular budget element and the re-sized savings element including the re-sized savings sub-element being merged or integrated into the composite view.

5. The computer interface of claim 1, wherein at least one of a shape of the at least one particular budget element, a size of an area defined by the at least one particular budget element and a location of the at least one particular budget element within the composite view is changed as a result of the at least one particular budget element being selected by the user and the user changing the amount of income allocated to the selected budget element.

6. The computer interface of claim 1, the plurality of budget elements comprising non-discretionary budget elements and discretionary budget elements.

7. The computer interface of claim 6, wherein more options are available to the user to adjust a discretionary budget element compared to more limited adjustment options for a non-discretionary budget element.

8. The computer interface of claim 7, wherein an amount of income allocated to at least one non-discretionary budget element is fixed and cannot be adjusted by the user.

9. The computer interface of claim 1, wherein after the budget has been established, a budget element is emphasized when an amount of income spent on the budget element exceeds the amount of income allocated to the budget element.

10. An interactive computer interface for providing a graphical representation of a budget generated by a personal finance program utilized by a user and having access to electronic transaction data and income data of the user, the graphical representation comprising a plurality of budget elements displayed within a composite view that collectively define the budget,
    wherein respective sizes of respective areas defined by respective budget elements represent respective amounts of user income allocated to spending at respective different merchants or on respective spending categories,
    wherein a total area collectively defined by the plurality of budget elements represents total income for the budget,
    wherein at least one of the budget elements comprises a savings element that indicates a target savings amount and that includes a savings sub-element corresponding to a savings amount derived from forgoing spending on one or more discretionary budget items represented as respective areas within respective budget elements within the graphical representation,
    wherein respective sizes of respective areas of the savings element and the savings sub-element are adjusted dynamically based at least in part upon the user inputting a change of an amount of income allocated to particular budget elements,
    wherein the size of the area defined by the savings sub-element within the savings element illustrating how much of the target savings amount derived is due to savings resulting from forgoing spending on the discretionary budget items represented by the particular budget element,
    wherein budget elements are fillable to indicate respective portions of allocated income that have been spent on respective budget elements, and
    the interactive computer interface presenting all budget elements in the graphical presentation as being integrated into the composite view based upon an algorithm for determining the layout of the budget elements.

11. The computer interface of claim 10, wherein at least one particular budget element is at least partially filled following user spending of income at a merchant or on a spending category corresponding to the at least one particular budget element to graphically indicate what portion of the allocated income was spent on the at least one particular budget element.

12. The computer interface of claim 10, wherein the at least one particular budget element is filled from a bottom toward a top of the at least one particular budget element or from a first side to a second side of the at least one particular budget element to graphically indicate what portion of the allocated income was spent on the at least one particular budget element.

13. The computer interface of claim 10, wherein a budget element is emphasized when an amount of income spent on that budget element exceeds the amount of income allocated to that budget element.

14. The computer interface of claim 10, wherein a first budget element is empty to indicate that none of the income allocated to the first budget element has been spent, a second budget element is partially filled to indicate a portion of the income allocated to the second budget element has been spent, and a third budget element is completely filled to indicate that all of the income allocated to the third budget element has been spent.

15. An interactive computer interface for providing a graphical representation of a budget generated by a personal finance program utilized by a user and having access to electronic transaction data and income data of the user, the graphical representation comprising a plurality of budget elements representing different merchants or spending categories and being displayed within a composite view and collectively defining the budget,
    wherein respective sizes of respective areas defined by respective budget elements represent respective amounts of user income allocated to spending towards respective budget elements, and
    wherein a total area collectively defined by the plurality of budget elements represents total income for the budget,
    wherein the plurality of budget elements being are respectively fillable to indicate respective allocated amounts of income that have been spent by the user on items at respective merchants or on respective categories corresponding to respective budget elements,
    wherein at least one of the budget elements comprises a savings element indicating a target savings amount and including a savings sub-element corresponding to a savings amount derived from forgoing spending on one or more discretionary budget items represented as respective areas within respective budget elements within the graphical representation,
    wherein respective sizes of respective areas of the savings element representing the target savings amount and the savings sub-element are dynamically adjusted based at least in part upon the user inputting a change of an amount of income allocated to particular budget elements,
    wherein respective sizes of respective areas of at least one particular budget element, the savings element and the savings sub-element change based at least in part upon a change of the amount of income allocated to the budget item represented by the at least one budget element,
    wherein the re-sized at least one particular budget element, the re-sized savings element and the re-sized savings sub-element are merged or integrated into the composite view, and
    the interactive computer interface presenting all budget elements in the graphical presentation as being integrated into the composite view based upon an algorithm for determining the layout of the budget elements.

16. The computer interface of claim 15, wherein a first amount of income allocated to at least one particular budget element is associated with the at least one particular budget element, and the first income amount is changed to a second amount of income in response to entry by the user of the desired amount of savings on the at least one particular budget element.

17. The computer interface of claim 15, wherein at least one of a shape of a particular budget element within the composite view, a size of an area defined by at least one particular budget element within the composite view and a location of the at least one particular budget element within the composite view is changed as a result of the user selecting the at least one particular budget element and changing the amount of income allocated to the selected at least one particular budget element.

18. The computer interface of claim 15, the plurality of budget elements comprising non-discretionary budget elements and discretionary budget elements.

19. The computer interface of claim 18, wherein more options are available to the user to adjust a discretionary budget element compared to more limited adjustment options for a non-discretionary budget element.

20. The computer interface of claim 15, wherein a budget element is emphasized when an amount of income spent on the budget element exceeds the amount of income allocated to the budget element.

21. The computer interface of claim 15, wherein a particular budget element is at least partially filled following spending of income by the user at a merchant or on a category of items corresponding to the particular budget element to graphically indicate what portion of the allocated income was spent on the particular budget element.

22. The computer interface of claim 21, wherein the particular budget element is filled from a bottom toward a top of the particular budget element or from a first side to a second side of the particular budget element to graphically indicate what portion of the allocated income was spent on the particular budget element.

23. The computer interface of claim 15, the plurality of budget elements being fillable to indicate respective allocated amounts of income that have been spent on respective budget elements based at least in part upon electronic data representing completed transactions received from a financial institution associated with the consumer.

24. The computer interface of claim 15, multiple budget elements having at least three edges adjacent to respective edges of other budget elements.

25. The computer interface of claim 15, at least one other budget element being repositioned within the single screen or view based at least in part upon adjustment of the a particular budget element selected by the user.

26. The computer interface of claim 15, at least one other budget element being resized, reshaped and repositioned within the single screen or view based at least in part upon adjustment of the a particular budget element selected by the user.

27. The computer interface of claim 15, a particular budget element selected by the user being adjusted by the user manipulating an input device to drag a corner of the selected particular budget element.

28. The computer interface of claim 15, respective budget elements identifying respective merchants.

29. The computer interface of claim 15, at least one budget element identifying a budget category and at least one other budget element identifying a merchant.

30. The computer interface of claim 15, the graphical representation being based on electronic transaction data of completed transactions reflected in an account the user has at a financial institution.

31. The computer interface of claim 19, wherein an amount of income allocated to at least one non-discretionary budget element is fixed and cannot be adjusted by the user.

32. The computer interface of claim 6, the graphical representation comprising separated first and second portions, the first portion including discretionary budget elements and no non-discretionary budget elements, the second portion including non-discretionary budget elements and no discretionary budget elements.

33. The computer interface of claim 18, the graphical representation comprising separated first and second portions, the first portion including discretionary budget elements and no non-discretionary budget elements, the second portion including non-discretionary budget elements and no discretionary budget elements.

34. The computer interface of claim 6, the non-discretionary budget elements and the discretionary budget elements being displayed as separated from each other by a divider.

35. The computer interface of claim 18, the non-discretionary budget elements and the discretionary budget elements being displayed as separated from each other by a divider.

36. The computer interface of claim 1, respective budget elements comprising two-dimensional budget elements defining an area, wherein respective areas defined by respective two-dimensional budget elements represent respective amounts of user income allocated to spending represented by respective two-dimensional budget elements.

37. The computer interface of claim 1, respective budget elements comprising three-dimensional budget elements defining a volume, wherein respective volumes of respective three-dimensional budget elements represent respective amounts of user income allocated to spending represented by respective three-dimensional budget elements.

* * * * *